(12) United States Patent
Tophoj et al.

(10) Patent No.: US 12,055,194 B2
(45) Date of Patent: Aug. 6, 2024

(54) DAMPER

(71) Applicant: TOPHOJ & GRATHWOL APS, Koge (DK)

(72) Inventors: Laust Tophoj, Næstved (DK); Nikolaj Grathwol, Virum (DK)

(73) Assignee: TOPHOJ & GRATHWOL APS, Koge (DK)

( * ) Notice: Subject to any disclaimer, the term of this patent is extended or adjusted under 35 U.S.C. 154(b) by 310 days.

(21) Appl. No.: 17/753,293

(22) PCT Filed: Jun. 26, 2020

(86) PCT No.: PCT/EP2020/068011
§ 371 (c)(1),
(2) Date: Feb. 25, 2022

(87) PCT Pub. No.: WO2020/260575
PCT Pub. Date: Dec. 30, 2020

(65) Prior Publication Data
US 2022/0412424 A1  Dec. 29, 2022

(30) Foreign Application Priority Data

Jun. 28, 2019  (EP) ..................................... 19183145
Jul. 15, 2019  (EP) ..................................... 19186203

(51) Int. Cl.
*F16F 7/104*  (2006.01)
*F16F 15/02*  (2006.01)
(Continued)

(52) U.S. Cl.
CPC ............ *F16F 7/104* (2013.01); *F16F 15/022* (2013.01); *E01D 19/00* (2013.01); *E04B 1/98* (2013.01);
(Continued)

(58) Field of Classification Search
CPC ............... F16F 2222/08; F16F 2236/12; F05B 2260/964
See application file for complete search history.

(56) References Cited

U.S. PATENT DOCUMENTS

2020/0076288 A1*  3/2020  Nerubenko ........... F16F 7/1005

FOREIGN PATENT DOCUMENTS

| CN | 104976276 A | * | 10/2015 |
| CN | 111086363 A | * | 5/2020 |

(Continued)

*Primary Examiner* — Melody M Burch
(74) *Attorney, Agent, or Firm* — Gregory L. Mayback; Mayback IP Law, P.A.

(57) ABSTRACT

A damper for damping vibrations of a structure comprises:
a first damping unit, comprising a first damping body having a first mass ($m_1$), a first spring element having a first spring constant ($k_1$) and a first damping element having a first damping constant ($c_1$), wherein said first damping body is configured to be attached to said structure via said first spring element and said first damping element; and
a second damping unit, comprising a second damping body having a second mass ($m_2$), a second spring element having a second spring constant ($k_2$) and a second damping element having a second damping constant ($c_2$), wherein said second damping body is configured to be attached to said first damping body via said second spring element and said second damping element.

19 Claims, 22 Drawing Sheets

(51) Int. Cl.
*E01D 19/00* (2006.01)
*E04B 1/98* (2006.01)
*F03D 13/20* (2016.01)

(52) U.S. Cl.
CPC ........ *F03D 13/20* (2016.05); *F05B 2240/912* (2013.01); *F05B 2260/964* (2013.01); *F16F 2222/08* (2013.01); *F16F 2222/12* (2013.01); *F16F 2228/007* (2013.01); *F16F 2236/12* (2013.01)

(56) References Cited

FOREIGN PATENT DOCUMENTS

| | | | | |
|---|---|---|---|---|
| DE | 102004020605 A1 | * | 11/2005 | ............. E01D 19/00 |
| JP | S63297837 A | * | 12/1988 | |
| JP | H02282584 A | * | 11/1990 | |
| JP | H1151111 A | * | 2/1999 | |
| WO | WO-2018186746 A1 | * | 10/2018 | ......... E02B 17/0017 |

* cited by examiner

DAMPER

CROSS-REFERENCE TO RELATED APPLICATIONS

This application claims the priority, under 35 U.S.C. §§ 119, 120, 172, 363, 365, and 371, of European patent application Nos. 19183145.2, filed Jun. 28, 2019, 19186203.6, filed Jul. 15, 2019, and International Application No. PCT/EP2020/068011, filed Jun. 26, 2020, which designated the United States and was published in English; the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention relates to a damper for damping vibrations of a structure, to a structure comprising such a damper, as well as to a computer-implemented method for configuring such a damper for broadband damping action.

BACKGROUND OF THE INVENTION 1.1 Vibrations and Damping

Mechanical vibrations can cause a variety of problems for engineering structures. Vibrations increases the stresses on structures and can lead to catastrophic failures, either due to overstressing or due to material fatigue caused by repeated cycles of stress. In less extreme cases, vibrations may be a problem for the serviceability of a structure, because movements of the structure may be impractical or simply uncomfortable to human inhabitants.

Whether a structure vibrates or not is often determined by the damping of the structure. If a structure is set in motion, for example by an earthquake, a gust of wind or a human footstep, the motion will decay, as the energy is converted into heat. The rate of this decay is related to the damping of the structure. A structure with low damping will vibrate for a long time (like a crystal glass emitting a sustained ringing tone when struck), whereas a structure with high damping will quickly come to rest (like a coffee cup emitting a short "plonk" noise when struck).

Damping not only determines the decay of free vibrations, but also the amplitude of vibrations caused by external forces. If a force repeatedly pushes a structure at just the right frequency (a resonant frequency), the structure can respond very strongly. The amplitude of motion at a resonant frequency is limited by the damping. When the damping is low, large resonant motions can occur. In contrast, when the damping is high, the structure response remains small at and near the resonant frequencies.

Damping is determined by the choice of materials as well as the tightness of connections and joints. Modern lightweight structures, e.g. steel structures with welded or tightly bolted joints, dissipate vibration energy rather slowly, so the "built-in" damping is typically very low. Vibrations and vibration damping is thus increasingly a focus in structural engineering.

1.2 Vibration Dampers

Vibrations of structures are often mitigated by adding Vibration Dampers, sometimes referred to as Vibration Absorbers. A Vibration Damper is a component added to the structure which reduces the vibrations by absorbing the vibration energy and converting it into heat. The Dampers considered here are passive devices, i.e. with no motors or power sources, whose vibrations are tuned to resonate with the structure. Such Dampers work by inertial forces acting between the mass of the Damper and the structure, and they are known in the engineering community as Tuned Mass Dampers or TMDs. A TMD is typically much smaller and lighter than the structure. In many cases, adding a TMD is a practical and economical way of mitigating vibrations.

TMDs are typically tailor-made to a specific application, i.e. to a specific structure or a group of practically identical structures. A major part of the cost of a TMD typically goes to precise surveys of the structure and to subsequent design and tuning of the TMD to the specific structure parameters.

Document DE102004020605AI discloses a damper for damping vibrations of a structure according to the preamble of claim 1. Similarly, document EP0554057A1 discloses a vibration control device of an active type which comprises a first additional mass body movable relative to the structure, support means for giving the body a period which synchronises with the natural period of the structure, a plurality of second additional mass bodies movable relative to the first additional mass body, and drive means for applying a control force between the first and second additional mass bodies in accordance with earthquake or the like. The first additional mass body allows the response of the structure to be reduced by making a single first additional mass body vibratile in all directions within a horizontal plane by means of laminated rubber supports or the like, restricting the direction of vibration for each second additional mass body having a small mass, to one direction, providing the second additional mass bodies in two or more horizontal directions, and applying a control force on the second additional mass bodies from a drive device at the time of an earthquake or the like. As further prior art, reference is made to JP2019112797A, JPS63297837A, JPH02282584A, JPH1151111A.

SUMMARY OF THE INVENTION 1.3 The TG Broadband Damper According to the Present Invention It is an object of the invention to propose a damper for damping vibrations of a structure which can work for a broad range of structures, without having to be tuned for the precise resonant frequency of any individual structure. The Damper must still be produced and tuned after precise specifications, but the broad range of application means that mass production becomes feasible, leading to considerable savings.

BRIEF DESCRIPTION OF THE DRAWINGS

According to the invention this object is achieved by a damper for damping vibrations of a structure. Advantageous embodiments are defined in the dependent claims.

The invention furthermore refers to a structure comprising such a damper.

A computer-implemented method according to the invention for configuring such a damper for broadband damping action.

Possible applications of the damper according to the invention, called "TG Broadband Damper" in the following, include for example:

Wind turbine towers in the construction phase, where the cylindrical towers stand freely without attached nacelle and blades. These towers are exposed to vibrations, mainly due to resonant vortex shedding in the wind, which reduce the fatigue life of the towers and may lead to tower collapse. The TG Broadband Damper may be particularly relevant for offshore wind turbine towers.

Fully constructed wind turbine towers, which are subject to fatigue-life reducing vibrations, e.g. due to wave loads acting on monopile foundations of offshore wind turbines.

Lightweight structures including building floors, footbridges and stairs. Vibrations of these structures, typically due to footsteps, lead to discomfort.

The TG Broadband Damper according to the invention may be implemented in different embodiments for different applications. One embodiment may comprise pendulums intended to suppress horizontal vibrations of wind turbine towers, while other embodiments may comprise spring-supported masses intended to suppress vertical vibration of building floors. Furthermore, the tuning frequencies may be quite different in different embodiments.

Such preferred embodiments will be discussed in detail with reference to the accompanying figures.

LIST OF FIGURES

Figure 1:
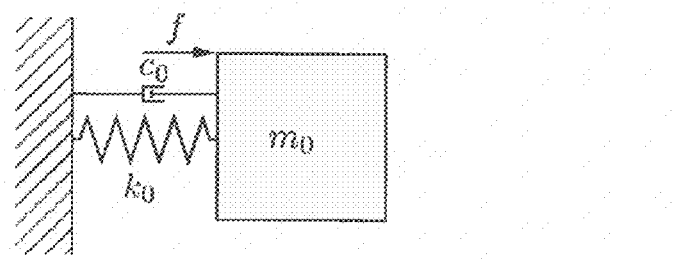

FIG. 1 is a sketch of a one-DOF structure with mass $m_0$. The elastic stiffness is given by $k_0$, and the linear damping is given by $c_0$. We look for the motion of $m_0$ due to and external influence f.

Figure 2:
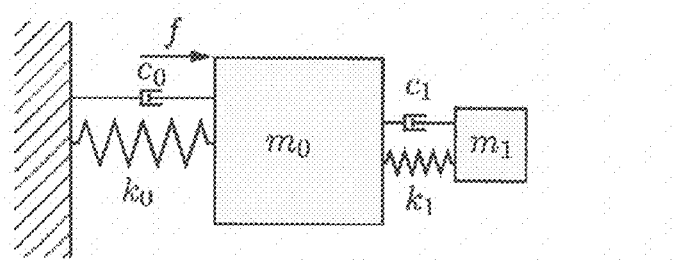

FIG. 2 is a sketch of a structure of mass $m_0$ with an attached Traditional Damper, also known as a Tuned Mass Damper (TMD). The Traditional Damper consists of $m_1$, $k_1$ and $c_1$, which are tuned to minimize the motion of $m_0$ due to an external influence f.

Figure 3:
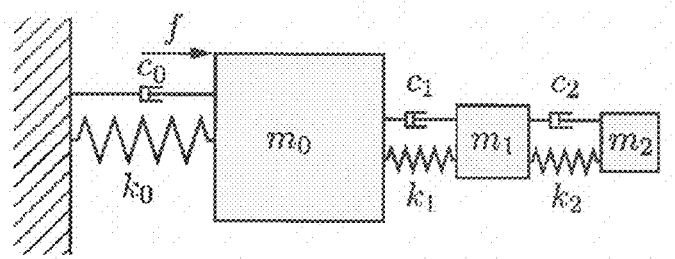

FIG. 3 is a sketch of a structure of mass $m_0$ with an attached Series Damper. The TG Broadband Damper according to the invention can be schematically represented in this way. The Series Damper comprises $m_1$, $m_2$, $k_1$, $k_2$, $c_1$ and $c_2$, which are tuned to minimize the motion of $m_0$ due to an external influence f.

Figure 4:
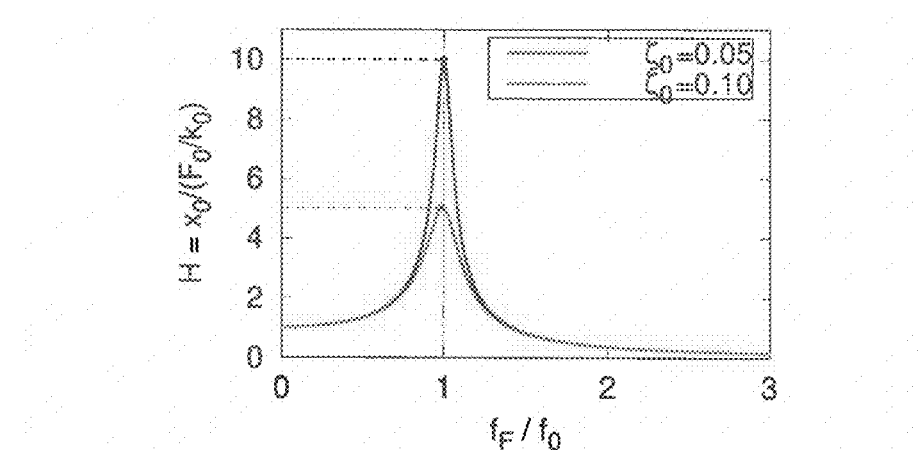

FIG. 4 illustrates the frequency response of a simple structure (with one DOF) with undamped eigenfrequency $f_0=1$. Such a structure is shown in FIG. 1. The forcing frequency $f_F$ is shown on the abscissa. The blue curve shows a system with low damping, and the red curve shows a system with a higher damping. In each case, a dashed curve shows the peak response as expressed by Eq. (1).

Figure 5:
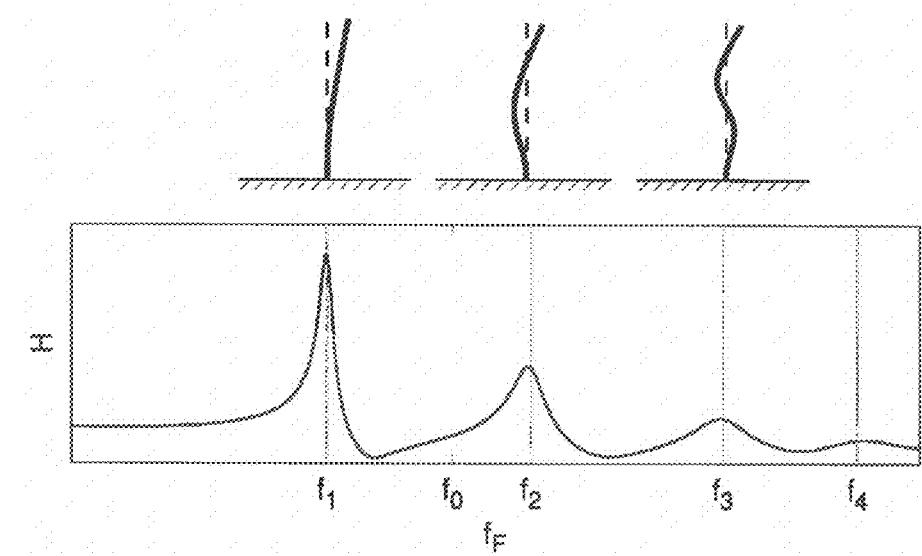

FIG. 5 illustrates an example of a typical frequency response of a tower with multiple DOFs. The mode frequencies appear as peaks in the frequency response plot. Above the first three 3 mode frequencies $f_1$, $f_2$ and $f_3$, the corresponding mode shapes are sketched above the corresponding frequency. When the structure is forced at the frequency $f_1$, it will respond by bending into the shape sketched above $f_1$. Similarly for forcing at $f_2$ and $f_3$. Successively higher mode frequencies correspond to modes with successively more complicated mode shapes.

Figure 6:
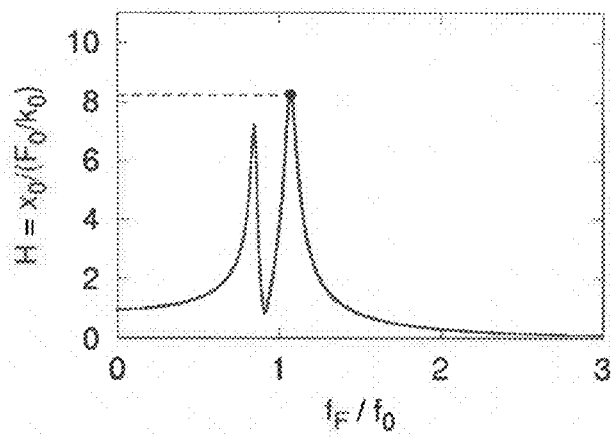

FIG. 6 illustrates the frequency response of a composite structure (this example has 2 DOFs). The solid curve shows the response amplitude. Compare this to the single-DOF frequency response curves shown in FIG. 4. The black dot shows the peak of the response, with the dashed curve indicating the peak value $H_\infty=8.25$, which can be interpreted by Eq. (2) to give $\zeta_{eq}=0.061$.

Figure 7:
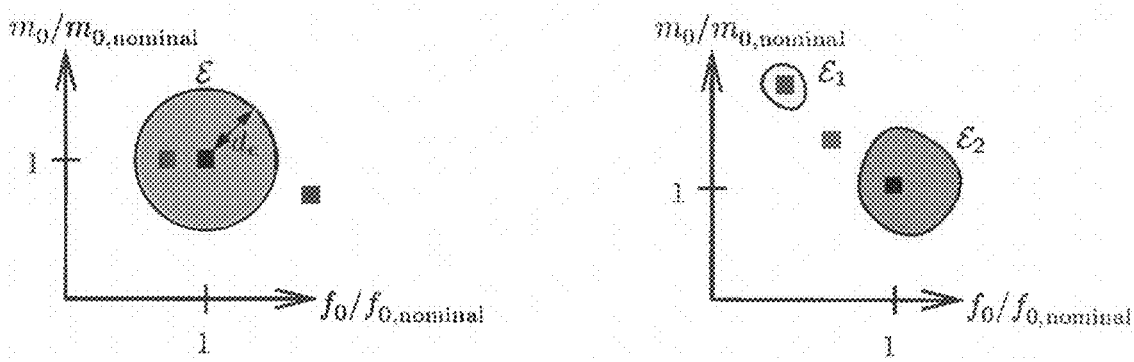

FIG. 7 is an illustration of Ensemble Tuning. The plane shows the structure parameters, i.e. the structure eigenfrequency $f_0$ and the structure modal mass $m_0$.

Left: The Ensembles used according to embodiments of the invention. The parameters are normalized by some nominal values $f_{0,nominal}$ and $m_{0,nominal}$. The grey circular region named $\varepsilon$ represents the Ensemble, i.e. the range of structures, for which a given TG Broadband Damper is tuned. The Ensemble Radius $d_e$ is the Radius of $\varepsilon$. The black square indicates the nominal structure. The red square shows a structure within the Ensemble, but with a lower frequency than the nominal structure. The blue square shows a structure outside the Ensemble, with a higher eigenfrequency and a lower mass than the nominal structure.

Right: Example of a more advanced Ensemble, which could be used with a damper according to the invention in the future. The Ensemble consists of two disjoint non-circular regions $\varepsilon_1$ and $\varepsilon_2$. The damping requirements could be different in the two regions, e.g. with a higher damping required in $\varepsilon_2$ than in $\varepsilon_1$. The green square indicates a structure within $\varepsilon_1$, the black square indicates a structure within $\varepsilon_2$, and the magenta square indicates a structure not within the Ensemble.

Figure 8:
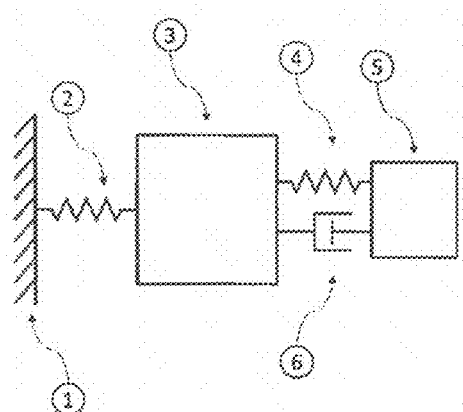

FIG. 8 shows a $1^{st}$ schematic embodiment of the damper according to the invention.

Figure 9:
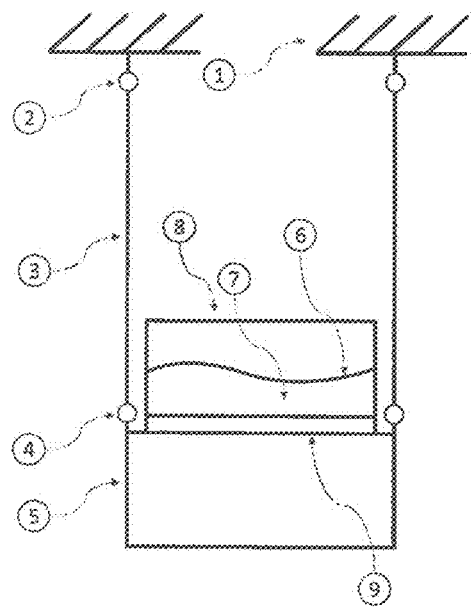

FIG. 9 shows a $2^{nd}$ schematic embodiment of the damper according to the invention.

Figure 10:
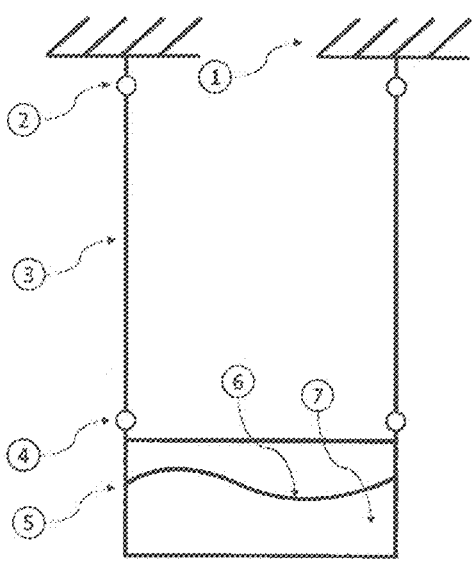

FIG. 10 shows a $3^{rd}$ schematic embodiment of the damper according to the invention.

Figure 11:
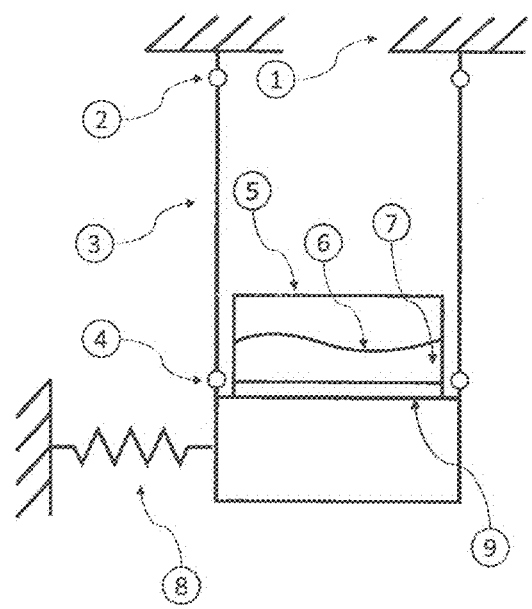

FIG. 11 shows a $4^{th}$ schematic embodiment of the damper according to the invention.

Figure 12:
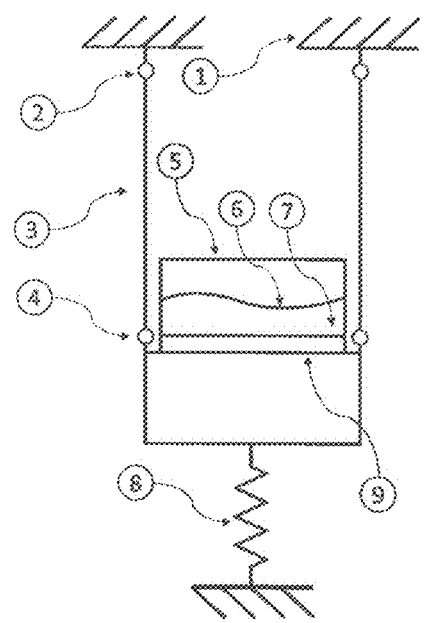

FIG. 12 shows a $5^{th}$ schematic embodiment of the damper according to the invention.

Figure 13:
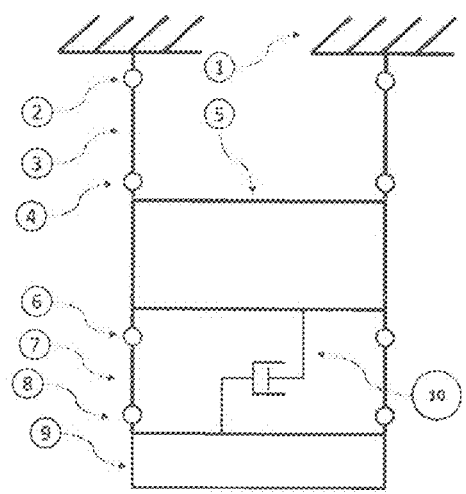

FIG. 13 shows a $6^{th}$ schematic embodiment of the damper according to the invention.

Figure 14:
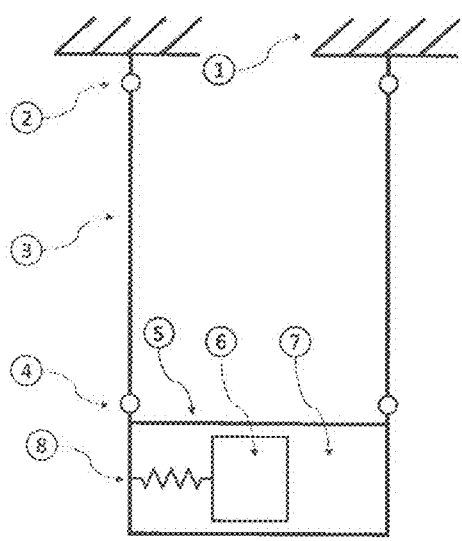

FIG. 14 shows a $7^{th}$ schematic embodiment of the damper according to the invention.

Figure 15:
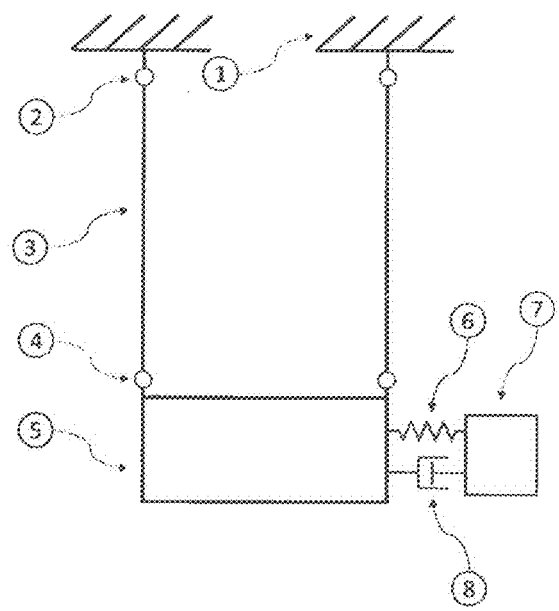

FIG. 15 shows an $8^{th}$ schematic embodiment of the damper according to the invention.

Figure 16:
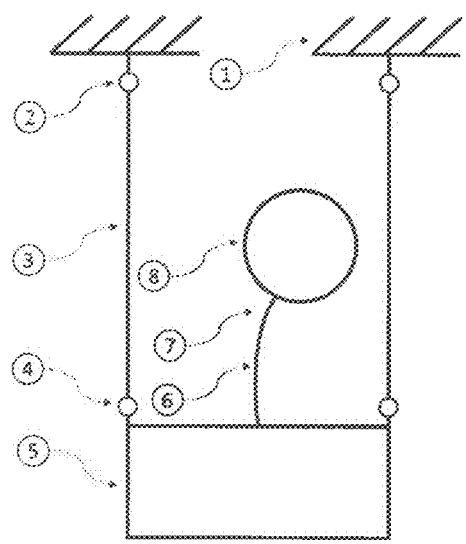

FIG. 16 shows a $9^{th}$ schematic embodiment of the damper according to the invention.

Figure 17:
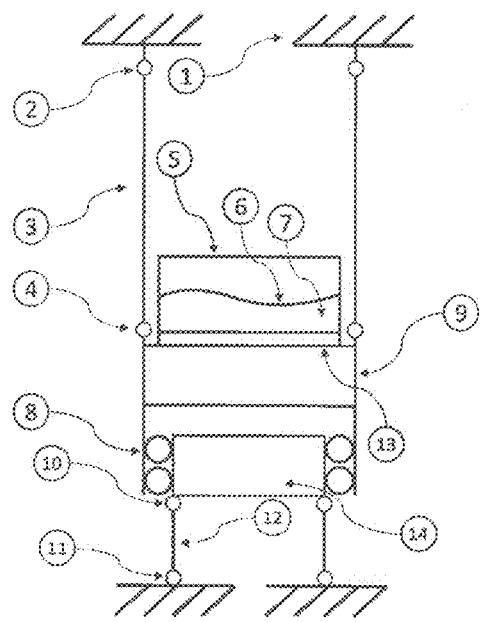

FIG. 17 shows a $10^{th}$ schematic embodiment of the damper according to the invention.

Figure 18:
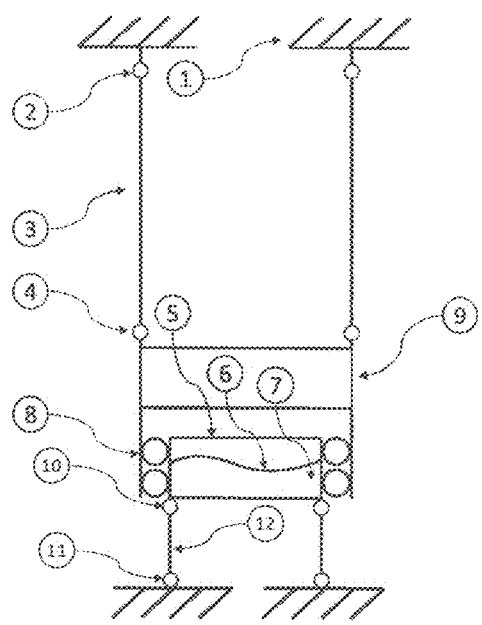

FIG. 18 shows a $11^{th}$ schematic embodiment of the damper according to the invention.

Figure 19:
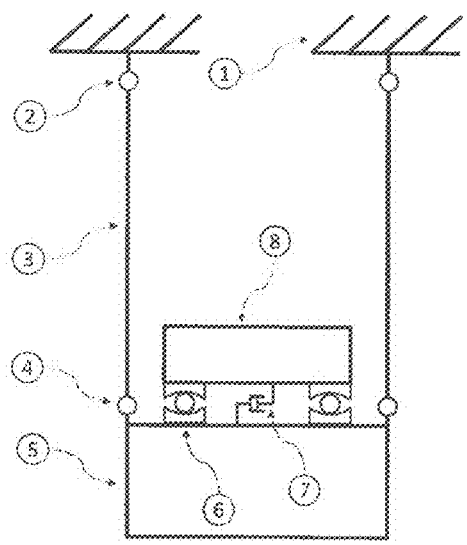

FIG. 19 shows a $12^{th}$ schematic embodiment of the damper according to the invention.

Figure 20:
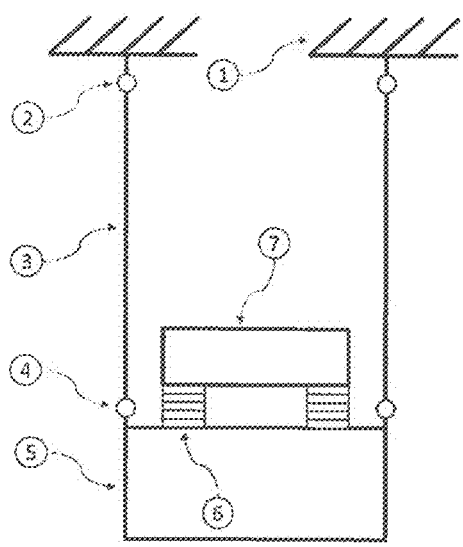

FIG. 20 shows a $13^{th}$ schematic embodiment of the damper according to the invention.

Figure 21:
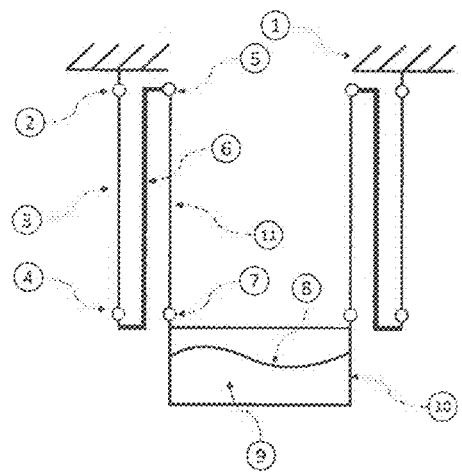

FIG. 21 shows a $14^{th}$ schematic embodiment of the damper according to the invention.

Figure 22:
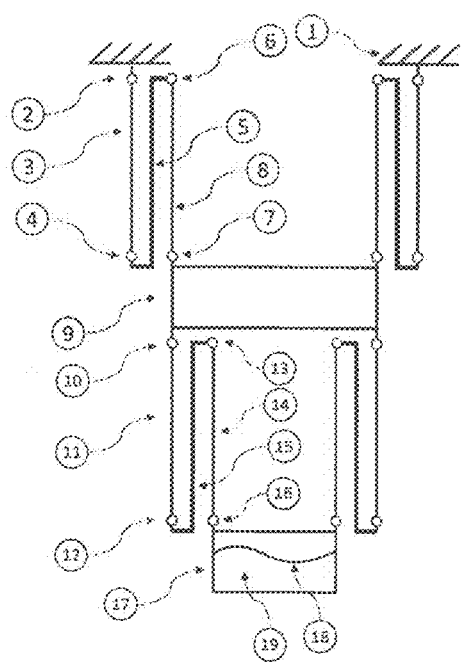

FIG. 22 shows a $15^{th}$ schematic embodiment of the damper according to the invention.

Figure 23:
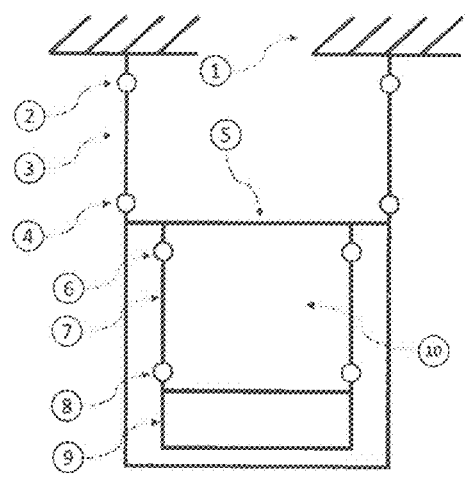

FIG. 23 shows a $16^{th}$ schematic embodiment of the damper according to the invention.

Figure 24:
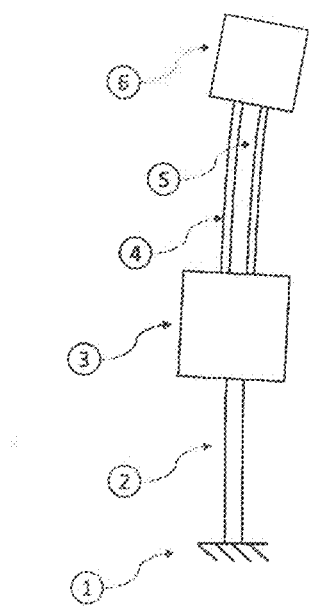

FIG. 24 shows a $17^{th}$ schematic embodiment of the damper according to the invention.

Figure 25:
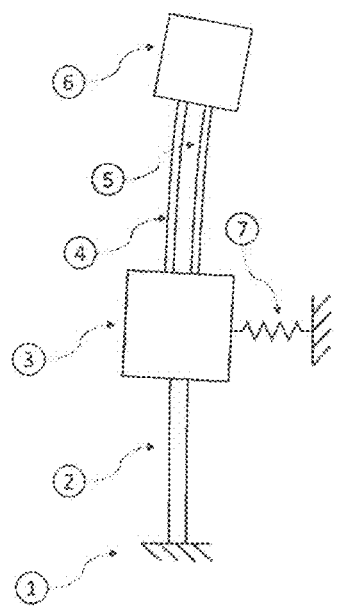

FIG. 25 shows a $18^{th}$ schematic embodiment of the damper according to the invention.

Figure 26:
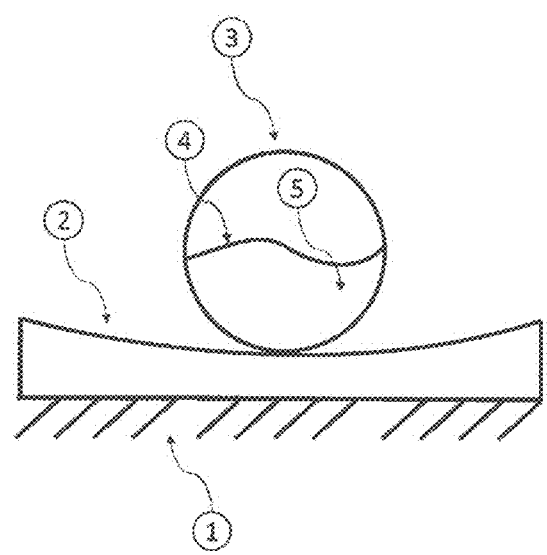

FIG. 26 shows a $19^{th}$ schematic embodiment of the damper according to the invention.

Figure 27:
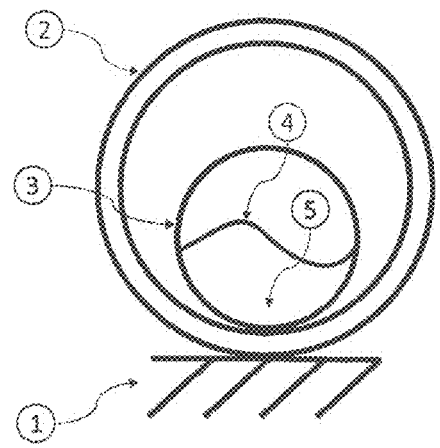

FIG. 27 shows a $20^{th}$ schematic embodiment of the damper according to the invention.

Figure 28:
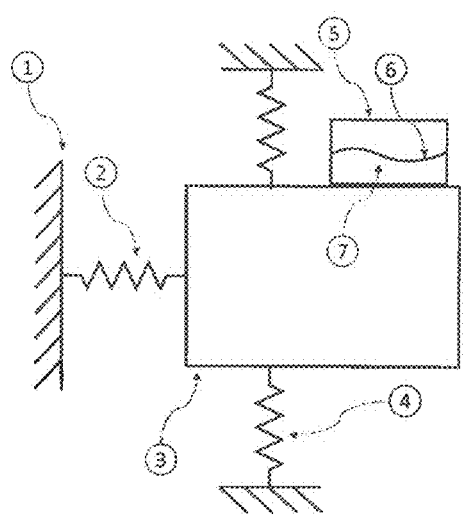

FIG. 28 shows a $21^{st}$ schematic embodiment of the damper according to the invention.

Figure 29:
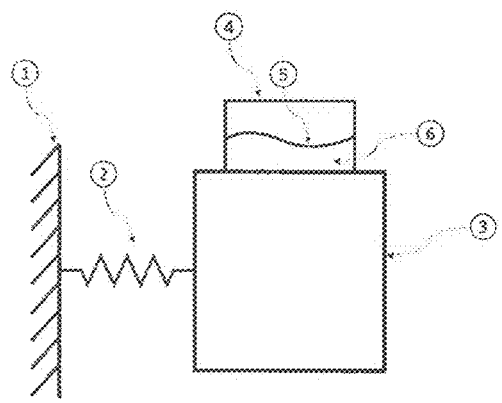

FIG. 29 shows a $22^{nd}$ schematic embodiment of the damper according to the invention.

Figure 30:
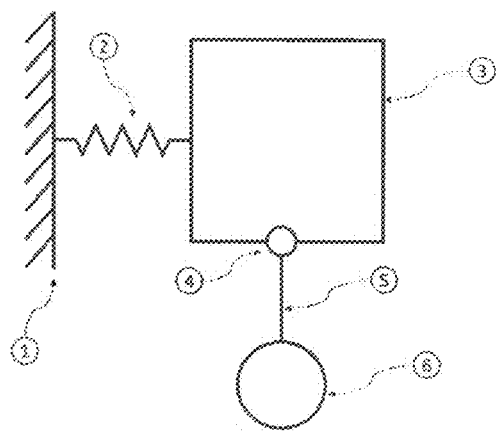

FIG. 30 shows a $23^{rd}$ schematic embodiment of the damper according to the invention.

Figure 31:
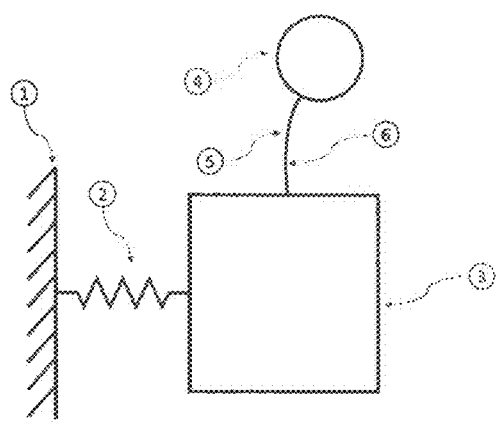

FIG. 31 shows a 24$^{th}$ schematic embodiment of the damper according to the invention.

Figure 32:
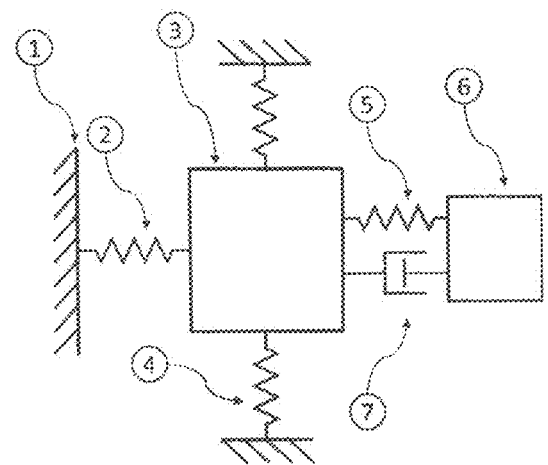

FIG. 32 shows a 25$^{th}$ schematic embodiment of the damper according to the invention.

Figure 33:
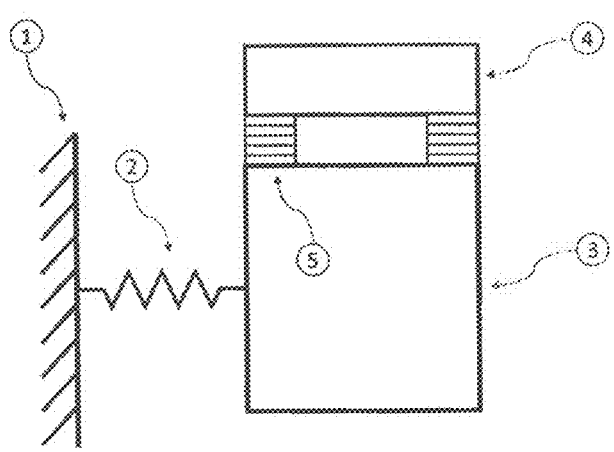

FIG. 33 shows a 26$^{th}$ schematic embodiment of the damper according to the invention.

Figure 34:
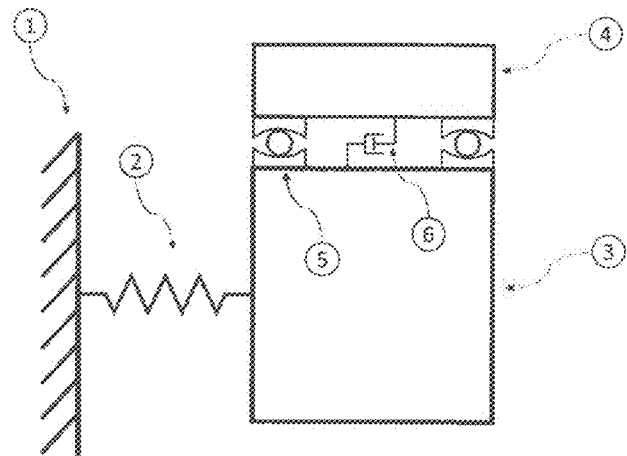

FIG. 34 shows a 27$^{th}$ schematic embodiment of the damper according to the invention.

Figure 35:
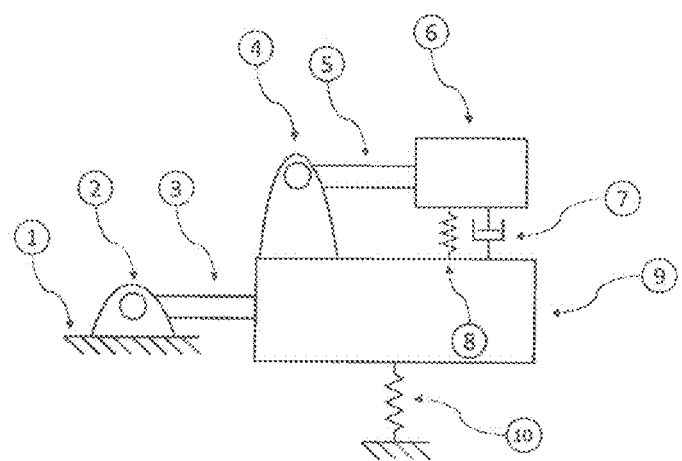

FIG. 35 shows a 28$^{th}$ schematic embodiment of the damper according to the invention.

Figure 36:
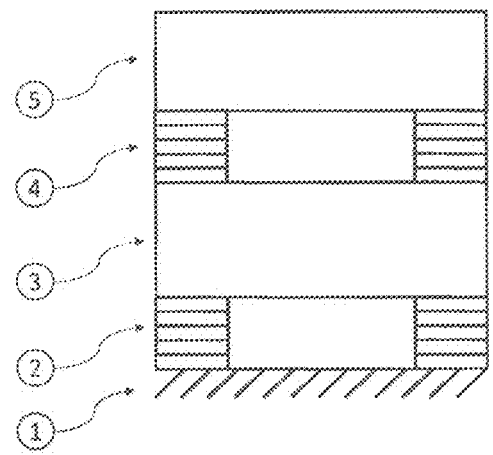

FIG. 36 shows a 29$^{th}$ schematic embodiment of the damper according to the invention.

Figure 37:
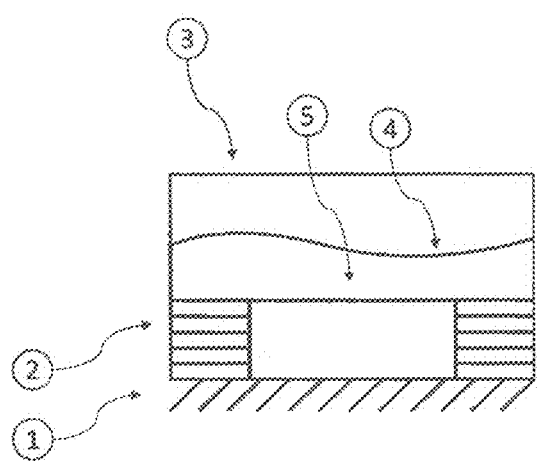

FIG. 37 shows a 30$^{th}$ schematic embodiment of the damper according to the invention.

Figure 38:
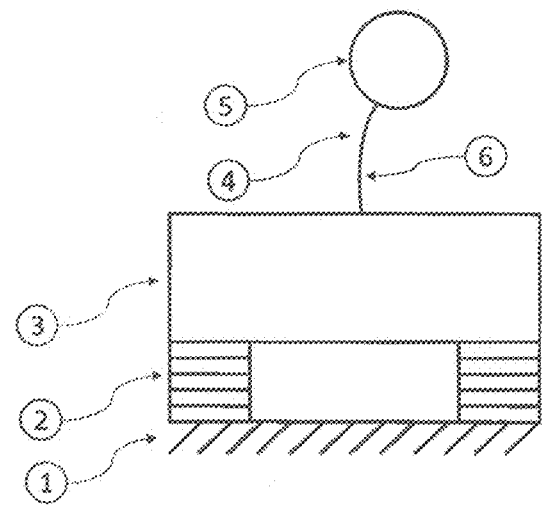

FIG. 38 shows a 31$^{st}$ schematic embodiment of the damper according to the invention.

Figure 39:
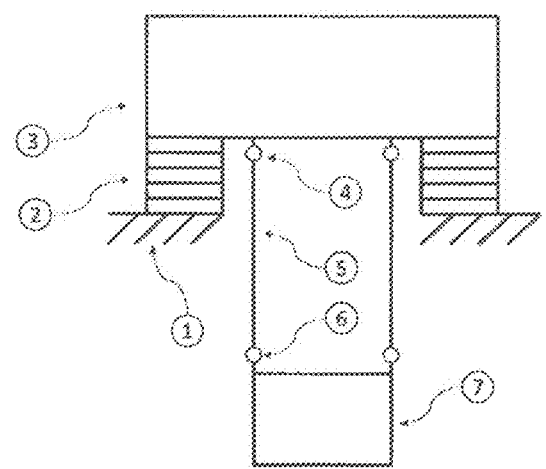

FIG. 39 shows a 32$^{nd}$ schematic embodiment of the damper according to the invention.

Figure 40:
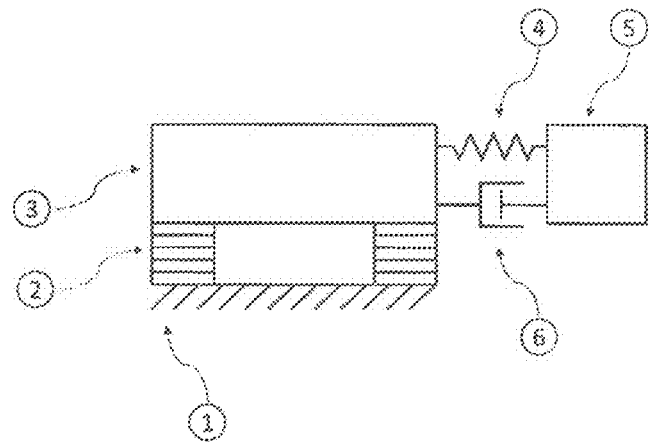

FIG. 40 shows a 33$^{rd}$ schematic embodiment of the damper according to the invention.

Figure 41:
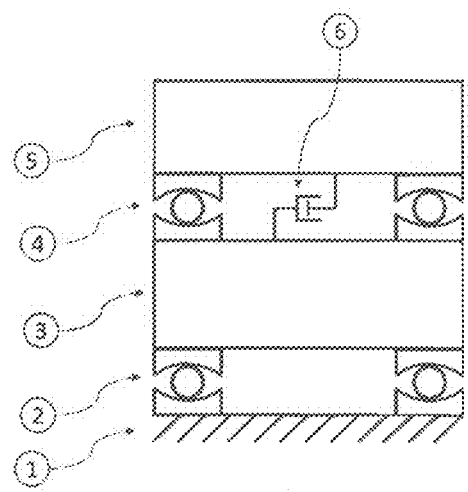

FIG. 41 shows a 34$^{th}$ schematic embodiment of the damper according to the invention.

Figure 42:
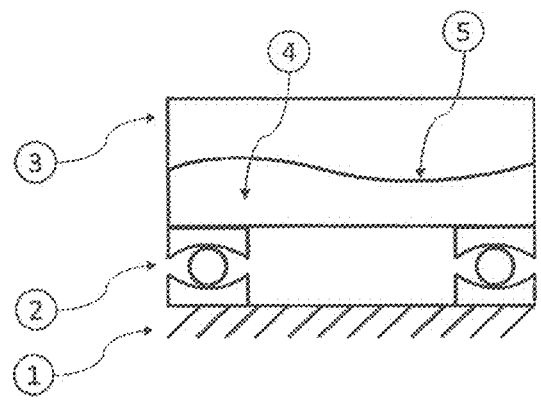

FIG. 42 shows a 35$^{th}$ schematic embodiment of the damper according to the invention.

Figure 43:
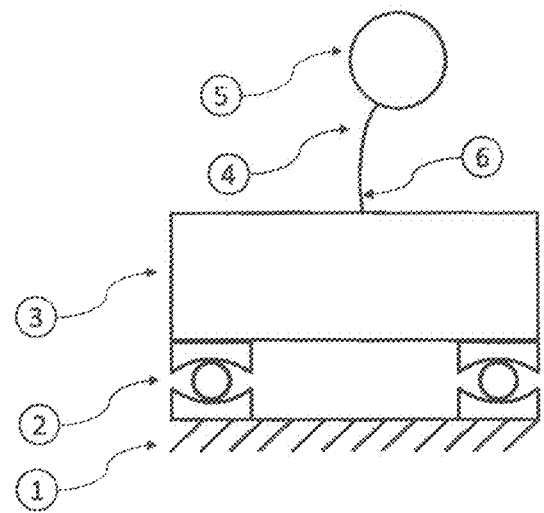

FIG. 43 shows a 36$^{th}$ schematic embodiment of the damper according to the invention.

Figure 44:
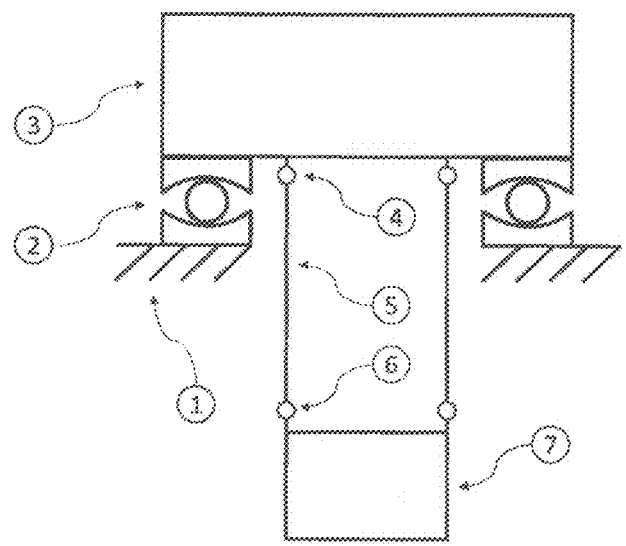

FIG. 44 shows a 37$^{th}$ schematic embodiment of the damper according to the invention.

Figure 45:
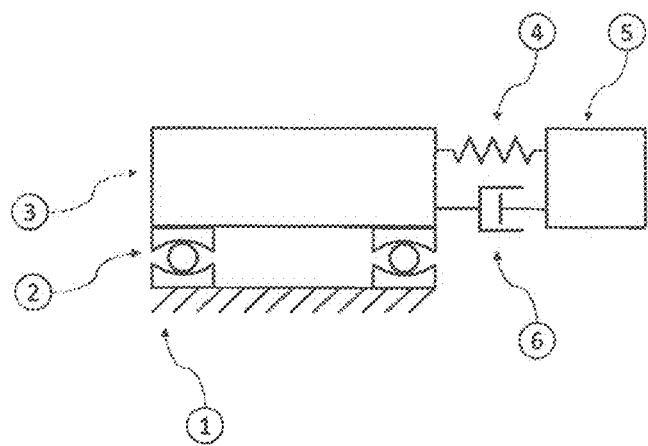

FIG. 45 shows a 38$^{th}$ schematic embodiment of the damper according to the invention.

Figure 46:
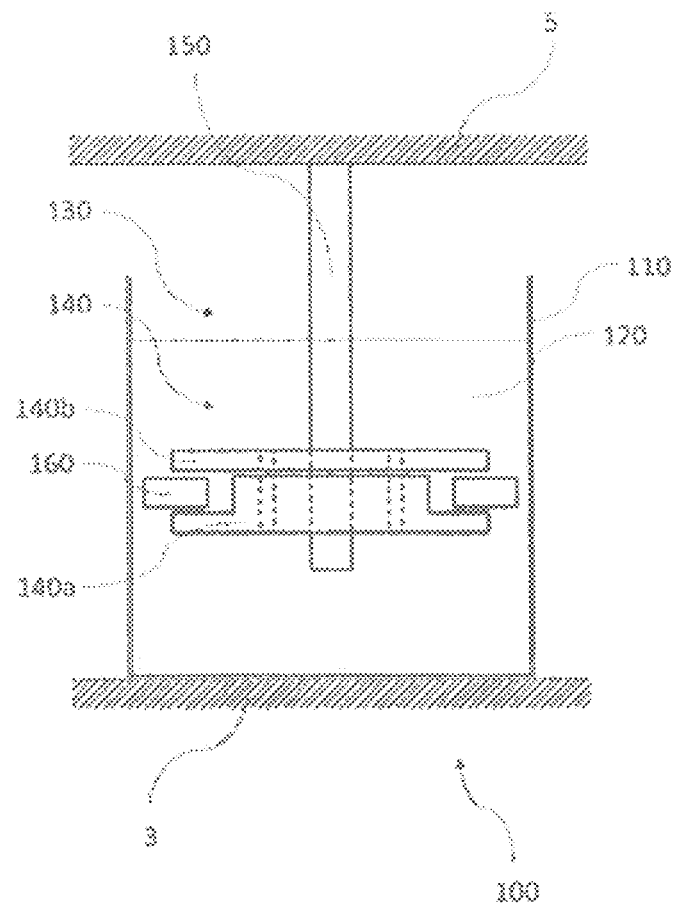

FIG. 46 shows a schematic cross-sectional view of a dashpot used as a part of the second damping element in an embodiment of the damper according to the invention.

DETAILED DESCRIPTION OF THE EMBODIMENTS

2 Technical Definition of Damping 2.1 Simple Damped Structure

A structure can be described in a simplified manner as shown on FIG. 1. The structure has one moving mass $m_0$, so it is said to have one degree-of-freedom or one DOF.

In FIG. 1, a mass $m_0$ is attached to the ground via a spring element (or simply "spring") of spring constant or spring rate (or simply "rate") $k_0$ and a linear damping element of damping constant or damping rate (or simply "rate") $c_0$. The constants $k_0$ and $c_0$ are force coefficients, with the spring rate $k_0$ measured in units of $$\frac{N}{m}$$

and the damping rate $c_0$ measured in units of $$\frac{N}{m/s}.$$

When the structure displacement is $x_0$ and the structure velocity is $\dot{x}_0$, the force on the structure is $F = -k_0 \cdot x_0 - c_0 \cdot \dot{x}_0$. The linear damping element can be visualized as the oil-filled piston-in-cylinder shock absorber (also known as a dashpot) used in an automobile.

It is practical to introduce the undamped eigenfrequency $f_0$, with $$2\pi f_0 = \sqrt{\frac{k_0}{m_0}},$$

and the non-dimensional damping ratio $$\zeta_0 = \frac{c_0}{2\sqrt{k_0 m_0}}.$$

If the structure is pulled to the side and released, it will oscillate back and forth at a frequency close to $f_0$. In the presence of damping, $\zeta_0 > 0$, these oscillations decay over time.

Consider now a horizontal force $f = F_0 \cos(2\pi f_F t)$ applied to the structure. The forcing has amplitude $F_0$ and varies at a frequency $f_F$ with the time t. After some time has passed, the structure will respond to the forcing by performing oscillations back and forth at the forcing frequency $f_F$ and at the amplitude $x_0$.

A frequency response is the normalized amplitude $$H = \frac{x_0}{F_0/k_0}$$

as a function of the forcing frequency $f_F$. A frequency response plot for the damped structure on FIG. 1 is shown on FIG. 4.

It can be see that the response is very large when $f_F \approx f_0$. This phenomenon is known as resonance. At resonance, the response H is only limited by the damping ratio $\zeta_0$. Indeed, the maximum value (mathematically speaking the infinity norm) of the response $$H_\infty = \max_{f_F}(H)$$

is described to a good approximation by $$H_\infty \approx \frac{1}{2\zeta_0}, \text{ or } \zeta_0 \approx \frac{1}{2H_\infty}. \quad (1)$$

The approximation, Eq. (1), is indicated on FIG. 4 by the dashed horizontal lines showing the approximate maximal response values.

2.2 Composite Structures

Real structures are composed of several parts, which can move independently, but are elastically connected. We say that they have more than one DOF. In this case, a periodic forcing will result in a more complicated frequency response than that of a single-DOF structure, typically with more than one resonance peak in the frequency response. Each resonance peak is associated with a mechanical mode and a particular mode shape, i.e. a particular shape of the vibrating structure. Each mode is also associated with a modal mass. A Vibration Damper is often installed with the purpose of damping the motion of a particular identified mode. An example of a frequency response of a multi-DOF tower with sketches of the associated first few mode shape is shown in FIG. 5.

In contrast to a single-DOF structure, a multi-DOF structure is not characterized by a single number expressing its damping. The mechanical behavior of a structure is however completely described in terms of its frequency response function H, so various measures of damping can be derived from H. FIG. 6 shows a frequency response for a multi-DOF structure. Of particular interest to structural engineers is the peak value $H_\infty$ of H, as indicated by the black dot on FIG. 6. At the forcing frequency where the peak occurs, the structure will respond strongly, possibly leading to problems as discussed in Sec. 1 above.

We shall however introduce an equivalent damping ratio $\zeta_{eq}$ by the relation shown in Eq. (1).

We define $$\zeta_{eq} \approx \frac{1}{2H_\infty}. \quad (2)$$

The equivalent damping introduced in Eq. (2) will be used to characterize the damping supplied to a structure by a Vibration Damper. If we consider the frequency response shown on FIG. 6 as corresponding to a structure with an attached Vibration Damper, we would say by Eq. (2) that the Damper achieves an equivalent damping of $\zeta_{eq}$=0.061, see the caption to FIG. 6.

3 Vibration Dampers: Detailed Description 3.1 Types of Dampers

As mentioned above, a structure without a Damper can be represented as a mass on a spring, see FIG. 1.

A Traditional Damper, also known in the prior art as a TMD, see FIG. 2, consists of a single mass $m_1$ attached to structure by the elastic stiffness $k_1$ and the damping coefficient $c_1$. Traditional Dampers have been in use for many years and can significantly reduce structure vibrations. The Damper must however be precisely tuned for the specific structure eigenfrequency $f_0$ and mass $m_0$, meaning that the Traditional Damper is rather inflexible and costly, with major costs associated with precise measurements of the structure properties and subsequent Damper adjustments.

The TG Broadband Damper according to the invention, see FIG. 3, is a Series Damper. It comprises two masses attached to a structure in series, with one mass $m_1$ connected to the structure $m_0$ through an elastic stiffness $k_1$ and a damping $c_1$, and another mass $m_2$ connected to $m_1$ through an elastic stiffness $k_2$ and a damping $c_2$. In other words, the damper according to the invention comprises a first damping unit, comprising a first damping body having a first mass $m_1$, a first spring element having a first spring constant $k_1$ and a first damping element having a first damping constant $c_1$, wherein said first damping body is configured to be attached to said structure via said first spring element and said first damping element; and a second damping unit, comprising a second damping body having a second mass $m_2$, a second spring element having a second spring constant $k_2$ and a second damping element having a second damping constant $c_2$, wherein said second damping body is configured to be attached to said first damping body via said second spring element and said second damping element.

The TG Broadband Damper according to the invention is optimized for broadband action. Optimization procedures will be discussed below.

The purpose of each of the above-mentioned Dampers is to reduce vibrations of the structure, when it is exposed to an influence f from the outside world. The force f may represent both external forces and ground movements, e.g. foot loads, traffic loads, wind forces, ground accelerations, earthquakes or machine induced vibrations.

Dampers may look rather different from the sketches, FIGS. 2 and 3. For example, the structure may be a high tower performing horizontal vibrations in a vibration mode with modal mass $m_0$ and frequency $f_0$. The connections realized by means of the spring elements $k_1$ and $k_2$ may comprise springs or by pendulum-like suspensions, where gravity provides the stiffnesses $k_1$ and $k_2$. As another example, the mass $m_2$ may be replaced by a liquid-filled container of effective mass $m_2$. The damping coefficients $c_1$ and $c_2$ may be due to actual dashpots or due to some other source of friction. In each case, it is important to take the effective mass of each component into account. This can be computed using the methods presented in [2].

3.2 Different Optimization Criteria for Tuning of Dampers

Dampers can be tuned with different optimization criteria in mind:

One may minimize the maximum $H_\infty$ of the frequency response function or, equivalently, maximize the equivalent damping ratio $\zeta_{eq}$, see Eq. (2). The TG Broadband Damper is optimized for maximum $\zeta_{eq}$ in this manner.

One may minimize the 2 norm of H, i.e. $H_2=\int H^2 df$, which minimizes the structure response variance under white-noise forcing.

One may maximize the decay rate of free vibrations obtained by a hold-and-release experiment. This is sometimes referred to as a "stability" criterion in the engineering literature.

Furthermore, the Damper may be optimized with different structures or groups of structures in mind:

The Damper may be Point Optimized, i.e. optimized for a single structure with predefined values of $f_0$ and $m_0$. This type of tuning has been employed in the tuning of the vast majority of existing Dampers.

We introduce the concept of Ensemble Tuning, where the Damper is optimized for a group (an Ensemble) of structures, whose frequency $f_0$ and mass $m_0$ can both vary. Ensemble Tuning is characterized by the Ensemble Radius $d_e$, which describes the allowed variation of $f_0$ and $m_0$. The TG Broadband Damper is Ensemble Tuned.

The definition of an Ensemble and the Ensemble Radius $d_e$ is illustrated in FIG. 7. The Ensemble is a set of structures with $f_0$ and $m_0$ varying around a set of parameters $f_{0,nominal}$ and $m_{0,nominal}$, which is denoted the Nominal Structure Parameters. The performance of a TG Broadband Damper are defined as the worst-case value of $\zeta_{eq}$ on the Ensemble.

3.3 Parameters Describing the TG Broadband Damper

The TG Broadband Damper is a Series Damper, which is preferably Ensemble Tuned for maximum equivalent damping $\zeta_{eq}$ over an Ensemble of Ensemble Radius $d_e$, see Sections 3.1 and 3.2 and FIG. 3.

Referring to FIG. 3, the following definitions apply: The frequencies defined below may be either computed from the spring rates $k_1$ and $k_2$ or from numerical models using standard methods. Alternatively, the frequencies can be directly measured by experiment, and the effective spring rates can subsequently be calculated. The angular frequency of the isolated main structure is $\omega_0$ with $$\omega_0 = \sqrt{\frac{k_0}{m_0}}$$

or equivalently, $k_0=m_0\omega_0^2$. The angular frequency of $m_1$, with $m_1$ and $m_2$ fixed together, is $\omega_1$ with $$\omega_1 = \sqrt{\frac{k_1}{m_1+m_2}}$$

or equivalently, $k_1=(m_1+m_2)\omega_0^2$. The angular frequency of $m_2$ is $\omega_2$ with $$\omega_2 = \sqrt{\frac{k_2}{m_2}}$$

or equivalently, $k_2=m_2\omega_2^2$.

$$\mu = \frac{m_1+m_2}{m_0}, \mu_2 = \frac{m_2}{m_1+m_2}, \tag{3}$$

$$\Omega_1 = \frac{\omega_1}{\omega_0}, \Omega_2 = \frac{\omega_2}{\omega_0},$$

$$\zeta_0 = \frac{c_1}{2m_0\omega_0}, \zeta_1 = \frac{c_1}{2(m_1+m_2)\omega_1}, \zeta_2 = \frac{c_2}{2m_2\omega_2}.$$

The parameters have the following significance: The most fundamental parameter describing a Damper is the Mass Ratio $\mu$, which essentially determines the price of the Damper. With higher $\mu$, both the price and the effectiveness of the Damper increase. The frequency ratio $\Omega_2$ is a critical parameter for a Series Damper and can be used to distinguish between various types of Series Dampers. The non-dimensional frequencies $\Omega_1$ and $\Omega_2$ (and their dimensional counterparts $\omega_1$ and $\omega_2$) describe the tuning of the masses $m_1$ and $m_2$. Lastly, the parameters $\zeta_0$, $\zeta_1$ and $\zeta_2$ describe the damping ratios associated with motion of each of the masses $m_0$, $m_1$ and $m_2$, respectively.

Note that a given set of Damper parameters can be realized by many different physical embodiments. Consider for example an SD with m $d_2$ replaced by an open liquid container, whose mass is 20% of the total mass of the Damper. Effectively (for a particular choice of contained geometry), one half of the liquid mass should be counted as $m_2$, and the other half should be counted as part of $m_1$, leading to an effective value of $\mu_2$ of $\mu_2=10\%$. Practical methods for computing the effective mass of a complicated DOF are given in [2]. It is critical to base the calculation of the TG Broadband Damper parameters, Eqs. (3) on the effective masses of each Damper component.

In summary, a TG Broadband Damper is described by choosing the parameters $\mu$, $\mu_2$, $\Omega_1$, $\Omega_2$, $\zeta_1$ and $\zeta_2$. The dimensional parameters of the TG Broadband Damper are then determined by using the Nominal Structure Parameters $f_0=f_{0,nominal}$ and $m_0=m_{0,nominal}$.

3.4 Procedure for Tuning the TG Broadband Damper

When designing a TG Broadband Damper for a specific application, one first selects a particular Mass Ratio $\mu$ and a particular Ensemble Radius $d_e$.

An approximation to the appropriate TG Broadband Damper parameters $\mu_2$, $\Omega_1$, $\Omega_2$, $\zeta_1$ and $\zeta_2$, see Eqs. (3), is then computed from a set of approximate relations developed below in Sec. 4 by detailed theoretical analysis of the system. In order to get improved Damper efficiency, the precise values of $\mu_2$, $\Omega_1$, $\Omega_2$, $\zeta_1$ and $\zeta_2$ may be refined by numerical optimization as described below:

For the numerical optimization, any computational language can be used, preferably with built-in routines for non-linear optimization. For example, the GNU Octave routine sqp can be used. For a given set of TG Broadband Damper parameters ($\mu_2$, $\Omega_1$, $\Omega_2$, $\zeta_1$ and $\zeta_2$), the equivalent damping $\zeta_{eq}$ is computed for a representative set of structures distributed within the Ensemble of Ensemble Radius $d_e$. For example, a set of structures on the circular boundary of the Ensemble can be used, see FIG. 7. The equivalent Ensemble damping $\zeta_{eq}$ is then taken as the lowest found value (the worst-case value) of $\zeta_{eq}$.

The equations needed for computing $H_\infty$ and subsequently $\zeta_{eq}$ are given below in Sec. 4, together with equations for approximate values of $\mu_2$, $\Omega_1$, $\Omega_2$, $\zeta_1$ and $\zeta_2$ to be used as a starting-point for the Ensemble Tuning process.

4 Detailed Mechanical Analysis of the Tg Broadband Damper

Below, we present a theoretical analysis of the TG Broadband Damper. Approximate tuning rules are derived, allowing the determination of TG Broadband Damper parameters, see Eqs. (3), for given values of $\mu$ and $d_e$.

The tuning of the TG Broadband Damper should be based on the effective value of $\mu$, i.e. disregarding parts of the Damper, which are effectively fixed to the structure. The following discussion applies to TG Broadband Dampers with $0.018 \leq \mu \leq 0.25$.

4.1 Equations of Motion

Consider the TG Broadband Damper represented in FIG. 3 with the parameters defined in Eqs. (3). The positions $x_i$ with i=0, 1, 2 as functions of time are defined as follows: The position of $m_0$ is denoted $x_0$. The position of $m_1$ relative to $m_0$ is denoted $x_1$. The position of $m_2$ relative to $m_1$ is denoted $x_2$. In each case, a dot denotes a time derivative, e.g.

$$\dot{x} = \frac{\partial x}{\partial t}.$$

The equations of motion follow from conservation of momentum for $m_0+m_1+m_2$, $m_1+m_2$ and $m_2$, respectively:

$$(m_0+m_1+m_2)\ddot{x}_0+(m_1+m_2)\ddot{x}_1+m_2\ddot{x}_2+c_0\dot{x}_0+k_0x_0=f, \tag{4a}$$

$$(m_1+m_2)(\ddot{x}_0+\ddot{x}_1)+m_2\ddot{x}_2+c_1\dot{x}_1+k_1x_1=0, \tag{4b}$$

$$m_2(\ddot{x}_0+\ddot{x}_1+\ddot{x}_2)+c_2\dot{x}_2+k_2x_2=0, \tag{4c}$$

For most applications, $\zeta_0 \approx 0$, and a non-zero value of $\zeta_0$ is known to have little effect on the system dynamics. Furthermore, Series Dampers are typically most effective with $\zeta_1 \ll 1$, corresponding to the fact that $m_1$ acts as a means for channeling the vibration energy into the relative motion of $m_2$, and this transfer is most effective, when $\zeta_1 \approx 0$. We therefore assume $\zeta_0=\zeta_1=0$, i.e. $c_0=c_1=0$. Dividing the equations in (4) by $m_0$, $m_1+m_2$ and $m_2$, respectively, we rewrite (4), $$(1+\mu)\ddot{x}_0 + \mu\ddot{x}_1 + \mu\mu_2\ddot{x}_2 + \omega_0^2 x_0 = \frac{f}{m_0}, \tag{5a}$$

$$\ddot{x}_0 + \ddot{x}_1 + \mu_2\ddot{x}_2 + \omega_1^2 x_1 = 0, \tag{5b}$$

$$\ddot{x}_0 + \ddot{x}_1 + \ddot{x}_2 + 2\zeta_2\omega_2\dot{x}_2 + \omega_2^2 x_2 = 0. \tag{5c}$$

4.2 Frequency-Response Functions

In order to express the frequency-response function (see Eq. (1)), we assume harmonic motions at the angular frequency ω, so $x_a \sim e^{i\omega t}$ with α=0, 1, 2, and solve Eqs. (5). This is done successively as follows. We first express $x_2$ from (5c) and insert the result into (5b), which yields $x_1$, and these results are then inserting into (5a), yielding $x_0$:

$$x_2 = H_2 \cdot (x_0 + x_1), \text{ with } H_2(\omega) = \frac{\omega^2}{\omega_2^2 - \omega^2 + 2i\zeta_2\omega_2\omega}, \quad (6a)$$

$$x_1 = H_1 \cdot x_0, \text{ with } H_1(\omega) = \frac{\omega^2(1+\mu_2 H_2)}{\omega_1^2 - \omega^2 + (1+\mu_2 H_2)}, \quad (6b)$$

$$x_0 = H_0 \cdot \frac{f}{m_0 \omega_0^2}, \text{ with } H_0(\omega) = \frac{\omega_0^2}{\omega_0^2 - \omega^2 + \mu\omega^2 D}, \text{ with} \quad (6c)$$

$$D(\omega) = (1+H_1)(1+\mu_2 H_2)$$

$$= \frac{\omega_1^2(1+\mu_2 H_2)}{\omega_1^2 - \omega^2(1+\mu_2 H_2)}.$$

4.3 Approximate tuning rules for $\Omega_1$, $\mu_2$ and $\zeta_2$

Based on theoretical considerations, see e.g. [6] and [7], we obtain the following approximate relations for the tuning of the parameters $\Omega_1$, $\mu_2$ and $\zeta_2$, expressed as functions of $\Omega_2$. We consider the subsystem consisting of DOFs 1 and 2 as a traditional Tuned Mass Damper optimized for minimal relative motion under fixed amplitude base excitation and use results from [7]. The ratio of the masses within this subsystem is $$\frac{m_2}{m_1} = \frac{\mu_2}{1-\mu_2}.$$

In the absence of $m_2$, the vibration frequency of $m_1$ relative to a fixed $m_0$ is $\Omega_1/\sqrt{1-\mu_2}$.

The shape of the frequency response function of the DOF 1-2 subsystem determines the properties of the assembled TG Broadband Damper. We use the results in [7], Section 4.4.2, for the optimal traditional damper optimized for fixed deflection base load excitation with minimal relative motion of the primary mass (in this case $m_1$). The optimal frequency $\Omega_1$ follows from determining the mean frequency of [7], eq. (4.80). The frequency ratio $\Omega_2/\leq_1$ follows from [7], Eq. (4.78), and the optimal value of $\zeta_2$ follows from [7], Eq. (4.82). The estimated optimal parameters are $$\frac{1}{\Omega_1/\sqrt{1-\mu_2}} = \frac{1}{2}\sqrt{1-\mu_2}\left(\sqrt{1+\sqrt{\frac{1}{2}\frac{\mu_2}{1-\mu_2}}} + \sqrt{1-\sqrt{\frac{1}{2}\frac{\mu_2}{1-\mu_2}}}\right) \quad (7)$$

$$\frac{1}{\Omega_1/\sqrt{1-\mu_2}} = \sqrt{(1-\mu_2)\left(1-\frac{3}{2}\mu_2\right)} \quad (8)$$

$$\zeta_2^2 = \frac{1}{8}\frac{\mu_2(1-\mu_2)\left(3-\sqrt{\frac{1}{2}\frac{\mu_2}{1-\mu_2}}\right)}{1-\frac{3}{2}\mu_2} \quad (9)$$

Solving Eq. (8) for $\mu_2$ and expanding Eq. (7) to lowest order in $\mu_2$, we get to very good approximation, $$\Omega_1 = 1 \quad (10)$$

$$\mu_2(\Omega_2) = \frac{2}{3}(1-\Omega_2^2) \quad (11)$$

$$\zeta_2^2 = \frac{1}{8}\frac{\mu_2(\Omega_2)(1-\mu_2(\Omega_2))\left(3-\sqrt{\frac{1}{2}\frac{\mu_2(\Omega_2)}{1-\mu_2(\Omega_2)}}\right)}{1-\frac{3}{2}\mu_2(\Omega_2)} \quad (12)$$

4.4 The estimate $d_e^*(\mu, \Omega_2)$ of the Ensemble Radius $d_e$

In order to quantify the broadband action of the TG Broadband Damper, we estimate the damper effect at the in the edge of the Ensemble. The estimated Ensemble Radius will be denoted $d_e^*$. First, we Taylor expand the denominator of Eq. (6c) around ω=0 and evaluate the imaginary part in the worst-case direction of the Ensemble, with a reduced structure angular frequency $\omega_0^*$ and a reduced mass ratio $m_0^*$, with $$\Omega_0^* = (1-d_e^*)\omega_0, \mu^* = (1-d_e^*)\mu. \quad (13)$$

The resonances, i.e. the forcing frequencies ω, where the real part of the denominator of (6c) becomes zero, occur due to the lowest order expansion of the real part of v Eq. (6c) when $\omega_0^{*2} - (1+\mu)\omega^2 = 0$, so we consider the resonant forcing frequency $$\omega = \frac{\omega_0^*}{\sqrt{1+\mu}}. \quad (14)$$

If the TG Broadband Damper is to provide broadband action up to the Ensemble Radius $d_e$, the imaginary part of the denominator of Eq. (6c) must be of the same magnitude as the imaginary part of the denominator at $\omega=\omega_0$. Based on [7], Eq. 4.81, we have $$\frac{1}{H_{0,max}} \approx \mu,$$

so we set $$\left|\text{Im}\left((1-d_e^*)\frac{\omega^2}{\omega_0^2}D\right)\right| = \mu. \quad (15)$$

We then insert the Taylor expansion of D and isolate $d_e^*$, $$(1-d_e^*)^4 = \frac{\mu(1+\mu)^{5/2}\Omega_2^3}{2\zeta_2\sqrt{\mu_2}}, \quad (16)$$

leading to $$d_e^* = 1 - \left(\frac{\mu(1+\mu)^{5/2}\Omega_2^3}{2\zeta_2\sqrt{\mu_2}}\right)^{1/4}. \quad (17)$$

This is expressed as a function of μ and $\Omega_2$ alone by inserting (11) and (12), $$d_e^*(\mu, \Omega_2) = 1 - \left(\frac{9}{2}\frac{\mu(1+\mu)^{5/2}\Omega_2^4}{(1-\Omega_2^2)^{3/2}\sqrt{3+6\Omega_2 - \sqrt{1+\Omega_2^2 - 2\Omega_2^4}}}\right)^{1/4}. \quad (18)$$

Eq. (18) provides a good estimate of the Ensemble Radius $d_e=d_e^*$ and allows for tuning of a TG Broadband Damper. According to the invention, we are interested in large Ensemble Radii, i.e. $d_e^* \geq 37.5\%$, and small mass ratios, $1.8\% \leq \mu \leq 25\%$.

5 Summary of the Analysis

The mechanical analysis of the damper has provided the approximate tuning rules in Eqs. (10), (11) and (12) to be preferably fulfilled. Furthermore, the estimate $d_e^*$ of the Ensemble Radius, Eq. (18) has been analytically derived, based on the allowed deviation of $f_0$ and $m_0$ in the Ensemble. These equations can be used in one of the two following ways. In each case, the mass ratio $\mu$ is considered given and fixed.

- For a given choice of $\Omega_2$, the Ensemble Radius $d_e$ can be estimated by $d_e^*$ as computed by Eq. (18), and the remaining TG Damper parameters can be computed by Eqs. (10), (11) and (12). The parameters may be further refined by numerical optimization as described in Section 3.4.
- If, on the other hand, the desired Ensemble Radius $d_e$ is given, Eq. (18) is numerically solved with $d_e^*=d_e$ to give the appropriate value of $\Omega_2$. Note that $d_e^*$ is a decreasing function of $\Omega_2$, so a requirement $d_e^* \geq d_e^{*'}$, where $d_e^{*'}$ is a given constant, is equivalent to a requirement that $\Omega_2 \leq \Omega_2'$, where $d_e^*(\mu, \Omega_2')=d_e^{*'}$. The value of $\Omega_2=\Omega_2'$ thus obtained is then used in Eqs. (10), (11) and (12) to give the remaining TG Broadband Damper parameters. The parameters may be further refined by numerical optimization as described in Section 3.4.

The damper according to the invention can be practically implemented in a variety of embodiments. Some preferred cases are described in the following with reference to FIGS. 8-45:

FIG. 8 shows a 1$^{st}$ practical embodiment of the damper according to the invention. In this schematic figure the first damping element is omitted since its damping constant is close to 0.

Synergistic Effects:
- The static deflection caused by gravity (vertical oriented damper) acting on the masses could be reduced by selecting a higher nominal frequency, $f_0$, within the ensemble radius. Higher frequency leads to higher stiffness and decreased static deflection.
- The EOSD (broad band) enables a more stable configuration by selecting a higher nominal frequency, $f_0$, within the ensemble radius. A higher frequency leads to a stiffer setup which is less sensitive to buckling, external vibrations etc.
- Mass of guides installed on the secondary damper mass would contribute to mass of the primary damper mass.

Elements:
1) Structure (moving) to be damped
2) Primary spring (corresponding to first spring element in this and all further embodiments)
3) Primary damper mass, $m_1$ (corresponding to first mass in this and all further embodiments)
4) Secondary spring (corresponding to second spring element in this and all further embodiments)
5) Secondary damper mass, $m_2$ (corresponding to second mass in this and all further embodiments)
6) Secondary damper (dashpot) (corresponding to second damping element in this and all further embodiments)

Description:
The embodiment can damp vibrations in the horizontal and/or vertical plane.

Frequency, $f_1$ and $f_2$, could be estimated by common theory or experimentally.

The internal damping ($\zeta_2$) can be determined experimentally.

The damper masses could be supported by guides.

FIG. 9 shows a 2$^{nd}$ practical embodiment of the damper according to the invention.

Synergistic Effects:
- In contrast to a traditional Tuned Liquid Dampers, all the liquid mass is exploited effectively, i.e. a part of the liquid mass contributes as the secondary damper mass and the rest as the primary damper mass, see [1].
- Due to the above-mentioned effective mass usage, the present setup allows the use of more flow restrictions than in a traditional Tuned Liquid Damper, allowing for greater internal damping of the wave motions. This is a significant advantage, because sufficient wave damping is traditionally very difficult to obtain in Tuned Liquid Dampers.
- The above-mentioned flow restrictions may furthermore be used to lower the wave frequency, adding flexibility and tuning possibilities to the setup.
- Due to the broadband damper effect of the EOSD, the pendulum frequency may be set significantly higher than the eigenfrequency of the structure to be damped. This allows for shorter pendulum lengths for the shown pendulum embodiment of the EOSD in cases, where very long pendulums are impractical.
- Due to the broadband damper effect of the EOSD, the pendulum frequency may be set significantly lower than the eigenfrequency of the structure to be damped. This allows for larger liquid tank sizes for the shown embodiment of the EOSD with a sloshing liquid component in cases, where high structure frequencies would otherwise necessitate impractically small liquid tanks.

This embodiment is similar to the 4$^{th}$ embodiment.

Elements:
1) Structure (moving) to be damped
2) Hinge (rotating joint)
3) Hanger (wire, cable, chain, rod, bar, beam)
4) Hinge (rotating joint)
5) Part of the primary damper mass (pendulum)
6) Liquid mass contributing both to the secondary damper mass and to the primary damper mass
7) Submerged obstacles such as gravel, perforated geometries, wires, tubes
8) Liquid tank/container
9) Rigid or flexible connection between liquid tank and primary damper mass Description:
The embodiment comprises two sub-structures: a pendulum (2,3,4,5) and a liquid tank (8).

The embodiment can damp vibrations in the horizontal plane.

Frequency, $f_1$ and $f_2$, could be estimated by common theory or experimentally.

The internal damping ($\zeta_2$) is determined experimentally.

The secondary damper equivalent 1-dof mass $m_2$ can be determined experimentally.

Damping ($\zeta_2$) is generated with obstacles submerged into the liquid. The mass of the obstacles contributes to the primary damper mass.

FIG. 10 shows a 3$^{rd}$ practical embodiment of the damper according to the invention.

Synergistic Effects:

This embodiment has synergistic effects similar to the 2$^{nd}$ embodiment.

Elements:
1) Structure (moving) to be damped
2) Hinge (rotating joint)
3) Hanger (wire, cable, chain, rod, bar, beam)
4) Hinge (rotating joint)
5) Liquid tank/container
6) Liquid mass contributing both to the secondary damper mass and to the primary damper mass
7) Submerged obstacles such as gravel, perforated geometries, wires, tubes Description:

This embodiment has synergistic to the 2$^{nd}$ embodiment.

FIG. 11 shows a 4$^{th}$ practical embodiment of the damper according to the invention.

Synergistic Effects:

This embodiment is similar to the 2$^{nd}$ embodiment.

The flexible connection between liquid tank and pendulum mass may lower liquid sloshing frequencies, while still exploiting the all of the liquid mass and possibly achieving a higher contribution to the secondary damper mass.

A low nominal frequency, $f_0$, allows for longer pendulum lengths for the shown pendulum embodiment of the EOSD in cases, where very short pendulums are impractical.

Elements:
1) Structure (moving) to be damped
2) Hinge (rotating joint)
3) Hanger (wire, cable, chain, rod, bar, beam)
4) Hinge (rotating joint)
5) Liquid tank/container
6) Liquid mass contributing both to the secondary damper mass and to the primary damper mass
7) Submerged obstacles such as gravel, perforated geometries, wires, tubes
8) Additional spring
9) Rigid or flexible connection between liquid tank and primary damper mass Description:

Similar to the 2$^{nd}$ embodiment.

The additional tension spring enables large displacements for high frequency dampers, by using long pendulum length and compensate loss of stiffness with a spring.

The flexible connection between liquid tank and pendulum mass enables lower liquid sloshing frequencies.

FIG. 12 shows a 5$^{th}$ practical embodiment of the damper according to the invention.

Synergistic Effects:

This embodiment has synergistic to the 2$^{nd}$ embodiment and similar to the 4$^{th}$ embodiment.

Elements:
1) Structure (moving) to be damped
2) Hinge (rotating joint)
3) Hanger (wire, cable, chain, rod, bar, beam)
4) Hinge (rotating joint)
5) Liquid tank/container
6) Liquid mass contributing both to the secondary damper mass and to the primary damper mass
7) Submerged obstacles such as gravel, perforated geometries, wires, tubes
8) Additional spring
9) Rigid or flexible connection between liquid tank and primary damper mass Description:

This embodiment is similar to the 2$^{nd}$ embodiment.

The additional tension spring enables large displacements for high frequency dampers, by using long pendulum length and compensate loss of stiffness with a spring.

The additional spring enables simple frequency adjustment, as the horizontal stiffness contribution from the spring (8) is proportional with the spring preload.

Compression springs could reduce the frequency, $f_1$, which can be advantageous for low frequency dampers, i.e. dampers with shorter pendulum lengths.

The flexible connection between liquid tank and pendulum mass enables lower liquid sloshing frequencies.

FIG. 13 shows a 6$^{th}$ practical embodiment of the damper according to the invention.

Synergistic Effects:

Due to the broadband damper effect of the EOSD, the pendulum frequency may be set significantly higher than the eigenfrequency of the structure to be damped. This allows for shorter pendulum lengths for the shown pendulum embodiment of the EOSD in cases, where very long pendulums are impractical.

The pendulum frequency may be set significantly lower than the eigenfrequency of the structure to be damped. This allows for longer pendulum lengths for the shown pendulum embodiment of the EOSD in cases, where very short pendulums are impractical.

Elements:
1) Structure (moving) to be damped
2) Hinge (rotating joint)
3) Hanger (wire, cable, chain, rod, bar, beam)
4) Hinge (rotating joint)
5) Primary damper mass
6) Hinge (rotating joint)
7) Hanger (wire, cable, chain, rod, bar, beam)
8) Hinge (rotating joint)
9) Secondary damper mass
10) Secondary damper (dashpot) or shear damping element (friction, magnet, viscous, viscoelastic, rubber, elastomer).

Description:

The embodiment comprises two sub-structures: a primary pendulum (2,3,4,5) and a secondary pendulum (6,7,8,9)

The embodiment can damp vibrations in the horizontal plane.

Frequency $f_1$ and $f_2$ of the pendulums are estimated by common theory or experimentally.

Damping ($\zeta_2$) can be determined experimentally.

Damping ($\zeta_2$) can be achieved with a dashpot or shear damping elements (friction, magnet, viscous, viscoelastic, rubber, elastomer).

FIG. 14 shows a 7$^{th}$ practical embodiment of the damper according to the invention.

Synergistic Effects:

In contrast to a traditional liquid type damper, all the liquid mass can be exploited effectively, i.e. a part of the liquid mass contributes as the secondary damper mass and the rest as the primary damper mass, see [2].

Due to the above-mentioned effective mass usage, the present setup allows the use of more flow restrictions than in a traditional liquid type damper, allowing for greater internal damping of the oscillator.

The above-mentioned flow restrictions may furthermore be used to lower the submerged oscillator frequency, adding flexibility and tuning possibilities to the setup.

The interaction between mass contributions to primary and secondary damper masses, enables advantageous tuning properties for the inverse pendulum, while still exploiting the all of the liquid mass.

Synergistic effects similar to the 6$^{th}$ embodiment.

Elements:
1) Structure (moving) to be damped
2) Hinge (rotating joint)
3) Hanger (wire, cable, chain, rod, bar, beam)
4) Hinge (rotating joint)
5) Liquid tank/container
6) Submerged damper mass contributing to the secondary damper mass.
7) Liquid mass contributing both to the secondary damper mass and to the primary damper mass
8) Secondary spring Description:

The embodiment comprises two sub-structures: a pendulum (2,3,4,5) and a submerged oscillator (6,8)

The embodiment can damp vibrations in the horizontal plane.

Frequency $f_1$ and $f_2$ of could be determined experimentally.

Damping ($\zeta_2$) can be determined experimentally.

Damping ($\zeta_2$) can be achieved with a dashpot or shear damping elements (friction, magnet, viscous, viscous-elastic, rubber, elastomer).

The primary and secondary damper equivalent 1-dof masses could be determined experimentally.

Damping ($\zeta_2$) can be generated by fluid dynamic energy loss and flow restrictions.

The oscillator (6,8) could be supported by guides.

FIG. 15 shows an 8$^{th}$ practical embodiment of the damper according to the invention.

Synergistic Effects:

This embodiment has synergistic effects similar to the 6$^{th}$ embodiment

Mass of guides installed on the secondary damper mass would contribute to mass of the primary damper mass.

Elements:
1) Structure (moving) to be damped
2) Hinge (rotating joint)
3) Hanger (wire, cable, chain, rod, bar, beam)
4) Hinge (rotating joint)
5) Primary damper mass
6) Secondary spring
7) Secondary mass
8) Secondary dashpot Description:

The embodiment comprises two sub-structures: a pendulum (2,3,4,5) and a damped oscillator (6,7,8)

The embodiment can damp vibrations in the horizontal plane.

Frequency $f_1$ and $f_2$ of could be determined experimentally or by theory.

Damping ($\zeta_2$) can be determined experimentally.

The oscillator (6,7,8) could be supported by guides.

FIG. 16 shows a 9$^{th}$ practical embodiment of the damper according to the invention.

Synergistic Effects:

This embodiment has synergistic effects similar to the 6$^{th}$ embodiment.

The EOSD (broad band) enables a more stable configuration by selecting a higher nominal frequency, $f_0$, within the ensemble radius. A higher frequency leads to a stiffer setup which can be less sensitive to buckling, external vibrations etc.

Mass of guides installed on the secondary damper mass would contribute to mass of the primary damper mass, enabling full exploitation of element masses.

Elements:
1) Structure (moving) to be damped
2) Hinge (rotating joint)
3) Hanger (wire, cable, chain, rod, bar, beam)
4) Hinge (rotating joint)
5) Primary damper mass
6) Elastic element (beam, bar, rod, leaf spring).
7) Shear damping element (friction, magnet, viscous, viscous-elastic, rubber, elastomer) connected between pendulum mass and secondary damper mass
8) Secondary damper mass Description:

The embodiment comprises two sub-structures: a pendulum (2,3,4,5) and a damped oscillator (6,7,8)

The embodiment can damp vibrations in the horizontal plane.

Frequency $f_1$ and $f_2$ of could be determined experimentally or by theory.

Damping ($\zeta_2$) can be determined experimentally.

FIG. 17 shows a 10$^{th}$ practical embodiment of the damper according to the invention.

Synergistic Effects:

This embodiment has synergistic effects similar to the 4$^{th}$ embodiment.

The flexible connection between secondary damper mass and pendulum mass enables lower frequencies, while still exploiting the secondary mass and possibly achieving a higher contribution to the secondary damper mass.

Elements:
1) Structure (moving) to be damped
2) Hinge (rotating joint)
3) Hanger (wire, cable, chain, rod, bar, beam)
4) Hinge (rotating joint)
5) Liquid tank/container
6) Liquid mass contributing both to the secondary damper mass and to the primary damper mass
7) Submerged obstacles such as gravel, perforated geometries, wires, tubes
8) Rolling joint (roller/sliding bearing) connecting (9) and (14)
9) Pendulum mass contributing to primary damper mass
10) Hinge (rotating joint)
11) Hinge (rotating joint)
12) Rigid rod, bar, beam
13) Rigid or flexible connection between liquid tank and primary damper mass
14) Inverse pendulum mass contributing to primary damper mass Description:

The embodiment comprises three sub-structures: zpendulum (2,3,4,9), inverse pendulum (10,11,12,14) and liquid tank (5,6,7).

The embodiment can damp vibrations in the horizontal plane.

Frequency $f_1$ and $f_2$ of could be determined experimentally.

Damping ($\zeta_2$) can be determined experimentally.

The inverse pendulum enables lower frequencies for pendulums.

The secondary damper equivalent 1-dof mass $m_2$ is determined experimentally.

FIG. 18 shows a 11$^{th}$ practical embodiment of the damper according to the invention.

Synergistic Effects:

This embodiment has synergistic effects similar to the 10th embodiment.

The interaction between mass contributions to primary and secondary damper masses, enables advantageous tuning properties for the inverse pendulum, while still exploiting the all of the liquid mass.

Elements:
1) Structure (moving) to be damped
2) Hinge (rotating joint)
3) Hanger (wire, cable, chain, rod, bar, beam)
4) Hinge (rotating joint)
5) Liquid tank/container
6) Liquid mass contributing both to the secondary damper mass and to the primary damper mass
7) Submerged obstacles such as gravel, perforated geometries, wires, tubes
8) Rolling joint (roller/sliding bearing) connecting (9) and (14)
9) Pendulum mass contributing to primary damper mass
10) Hinge (rotating joint)
11) Hinge (rotating joint)
12) Rod, bar, beam Description:

The embodiment comprises two sub-structures: a pendulum (2,3,4,9) and a liquid tank (5,6,7).

The embodiment can damp vibrations in the horizontal plane.

Frequency $f_1$ and $f_2$ of could be determined experimentally.

Damping ($\zeta_2$) can be determined experimentally.

The inverse pendulum enables lower frequencies for pendulums.

The secondary damper equivalent 1-dof mass $m_2$ is determined experimentally.

FIG. 19 shows a 12th practical embodiment of the damper according to the invention.

Synergistic Effects:

This embodiment has synergistic effects similar to the 6th embodiment.

Mass of bearings would contribute to mass of the primary damper mass, enabling full exploitation of element masses.

Elements:
1) Structure (moving) to be damped
2) Hinge (rotating joint)
3) Hanger (wire, cable, chain, rod, bar, beam)
4) Hinge (rotating joint)
5) Primary damper mass
6) Bearings with curved track or bearings following a curved track or guide.
7) Secondary damper (dashpot)
8) Secondary damper mass Description:

The embodiment comprises two sub-structures: a pendulum (2,3,4,5) and a bearing supported mass (6,7,8).

The embodiment can damp vibrations in the horizontal plane.

Frequency $f_1$ and $f_2$ of could be determined experimentally.

Damping ($\zeta_2$) can be determined experimentally.

As the secondary damper mass moves horizontally, the curved track the forces the secondary mass upwards contributing to a change in potential energy, i.e. the restoring force (stiffness) is gravity based.

Damping ($\zeta_2$) can be achieved with a dashpot or shear damping elements (friction, magnet, viscous, viscous-elastic, rubber, elastomer).

FIG. 20 shows a 13th practical embodiment of the damper according to the invention.

Synergistic Effects:

This embodiment has synergistic effects similar to the 6th embodiment.

Mass of the elastic bodies would contribute to mass of the primary damper mass, enabling full exploitation of element masses.

Elements:
1) Structure (moving) to be damped
2) Hinge (rotating joint)
3) Hanger (wire, cable, chain, rod, bar, beam)
4) Hinge (rotating joint)
5) Primary damper mass
6) Elastic body/element able to shear, e.g. coil spring, elastomer pad/bearing, elastomer, laminated pad/bearing, sandwich element
7) Secondary damper mass Description:

The embodiment comprises two sub-structures: a pendulum (2,3,4,5) and a damped oscillator (6,7).

The embodiment can damp vibrations in the horizontal plane.

Frequency $f_1$ and $f_2$ of could be determined experimentally.

Damping ($\zeta_2$) can be determined experimentally.

Damping ($\zeta_2$) could be generated by friction in shearing the elastic body.

FIG. 21 shows a 14th practical embodiment of the damper according to the invention.

Synergistic Effects:

This embodiment has synergistic effects similar to the 4th embodiment.

Mass of the rigid elements (6) could contribute to mass of the primary damper mass.

Elements:
1) Structure (moving) to be damped
2) Hinge (rotating joint)
3) Hanger (wire, cable, chain, rod, bar, beam)
4) Hinge (rotating joint)
5) Hinge (rotating joint)
6) Rigid element enabling a fixed connection between (4,5)
7) Hinge (rotating joint)
8) Liquid mass contributing both to the secondary damper mass and to the primary damper mass
9) Submerged obstacles such as gravel, perforated geometries, wires, tubes
10) Liquid tank
11) Hanger (wire, cable, chain, rod, bar, beam)

Description:

The embodiment comprises two sub-structures: a double pendulum (2,3,4,5,6,7,11) and a liquid tank (10).

The embodiment can damp vibrations in the horizontal plane.

Frequency $f_1$ and $f_2$ of could be determined experimentally.

The secondary damper equivalent 1-dof mass $m_2$ is determined experimentally.

Damping ($\zeta_2$) can be determined experimentally.

Damping ($\zeta_2$) can be generated with obstacles submerged into the liquid. The mass of the obstacles contributes to the primary damper mass.

The rigid element (6) enables reduced height for long pendulum lengths, i.e. combing two pendulum lengths (3,11).

FIG. 22 shows a 15th practical embodiment of the damper according to the invention.

Synergistic Effects:
This embodiment has synergistic effects similar to the 14th embodiment.
Mass of the rigid elements (15) would contribute to mass of the primary damper mass.

Elements:
1) Structure (moving) to be damped
2) Hinge (rotating joint)
3) Hanger (wire, cable, chain, rod, bar, beam)
4) Hinge (rotating joint)
5) Rigid element enabling a fixed connection between (4,6)
6) Hinge (rotating joint)
7) Hinge (rotating joint)
8) Hanger (wire, cable, chain, rod, bar, beam)
9) Primary damper mass
10) Hinge (rotating joint)
11) Hanger (wire, cable, chain, rod, bar, beam)
12) Hinge (rotating joint)
13) Hinge (rotating joint)
14) Hanger (wire, cable, chain, rod, bar, beam)
15) Rigid element enabling a fixed connection between (12,13)
16) Hinge (rotating joint)
17) Liquid tank
18) Liquid mass contributing both to the secondary damper mass and to the primary damper mass
19) Submerged obstacles such as gravel, perforated geometries, wires, tubes Description:
The embodiment comprises three sub-structures: double pendulum (2,3,4,5,6,7,8,9), double pendulum (10,11,12,13,14,15,16) and a liquid tank (17).
The embodiment can damp vibrations in the horizontal plane.
Frequency $f_1$ and $f_2$ of could be determined experimentally.
The secondary damper equivalent 1-dof mass $m_2$ is determined experimentally.
Damping ($\zeta_2$) can be determined experimentally.
Damping ($\zeta_2$) can be generated with obstacles submerged into the liquid. The mass of the obstacles contributes to the primary damper mass.
The rigid elements (5,15) enables reduced height for long pendulum lengths, i.e. combing to pendulum lengths.

FIG. 23 shows a 16th practical embodiment of the damper according to the invention.

Synergistic Effects:
This embodiment has synergistic effects similar to the 7th embodiment.
The interaction between mass contributions to primary and secondary damper masses, enables advantageous tuning properties for the submerged pendulum, while still exploiting the all of the liquid mass.

Elements:
1) Structure (moving) to be damped
2) Hinge (rotating joint)
3) Hanger (wire, cable, chain, rod, bar, beam)
4) Hinge (rotating joint)
5) Liquid tank/container
6) Hinge (rotating joint)
7) Hanger (wire, cable, chain, rod, bar, beam)
8) Hinge (rotating joint)
9) Submerged secondary damper mass
10) Liquid mass (Liquid tank/container) contributing both to the secondary damper mass and to the primary damper mass Description:
The embodiment comprises three sub-structures: primary pendulum (2,3,4), liquid tank (5) and submerged pendulum (6,7,8,9).
The embodiment can damp vibrations in the horizontal plane.
Frequency $f_1$ and $f_2$ of could be determined experimentally.
The primary and secondary damper equivalent 1-dof mass could be determined experimentally.
Damping ($\zeta_2$) can be determined experimentally.
Damping ($\zeta_2$) can be generated by fluid dynamic energy loss and flow restrictions FIG. 24 shows a 17th practical embodiment of the damper according to the invention.

Synergistic Effects:
The static deflection caused by gravity (vertical oriented damper) acting on the masses can be reduced by selecting a higher nominal frequency, $f_0$, within the ensemble radius. Higher frequency leads to higher stiffness and decreased static deflection.
The rotation of the primary damper mass lead to lower frequencies, which can be advantageous for low frequency damper designs.
The EOSD (broad band) enables a more stable configuration by selecting a higher nominal frequency, $f_0$, within the ensemble radius. A higher frequency leads to a stiffer setup which can be less sensitive to buckling, external vibrations etc.
Mass of the damping and elastic elements would contribute to mass of the primary damper mass, enabling full exploitation of element masses (4,5).

Elements:
1) Structure (moving) to be damped
2) Flexible/elastic element (beam, bar, rod, leaf spring).
3) Primary damper mass which can be movable along the elastic element to obtain frequency adjustment.
4) Shear damping element (friction, magnet, viscous, viscous-elastic, rubber, elastomer).
5) Flexible/elastic element (beam, bar, rod, leaf spring).
6) Secondary damper mass which can be movable along the elastic element to obtain frequency adjustment.

Description:
The embodiment can damp vibrations in the horizontal plane and/or vertical plane by rotating the damper.
Frequency $f_1$ and $f_2$ of could be determined experimentally.
The primary and secondary damper equivalent 1-dof mass could be determined experimentally.
Damping ($\zeta_2$) can be determined experimentally.
The movable masses are fixed onto the elastic element when the desired frequency can be achieved.
The damper mass gravitational center could be offset from where the mass can be fixed to elastic element.

FIG. 25 shows a 18th practical embodiment of the damper according to the invention.

Synergistic Effects:
This embodiment has synergistic effects similar to the 17th embodiment.

Elements:
1) Structure (moving) to be damped.
2) Flexible/elastic element (beam, bar, rod, leaf spring).

3) Primary damper mass which can be movable along the elastic element to obtain frequency adjustment.
4) Shear damping element (friction, magnet, viscous, viscous-elastic, rubber, elastomer).
5) Flexible/elastic element (beam, bar, rod, leaf spring).
6) Secondary damper mass which can be movable along the elastic element to obtain frequency adjustment.
7) Additional spring Description:
The embodiment can damp vibrations in the horizontal plane and/or vertical plane by rotating the damper.
Frequency $f_1$ and $f_2$ of could be determined experimentally.
The primary and secondary damper equivalent 1-dof mass could be determined experimentally.
Damping ($\zeta_2$) can be determined experimentally.
The movable masses are fixed onto the elastic element when the desired frequency can be achieved.
The damper mass gravitational center could be offset from where the mass can be fixed to elastic element.

FIG. 26 shows a 19$^{th}$ practical embodiment of the damper according to the invention.

Synergistic Effects:
This embodiment has synergistic effects similar to the 4$^{th}$ embodiment.

Elements:
1) Structure (moving) to be damped
2) Concave surface
3) Part of the primary damper mass (liquid tank) sphere, cylinder shaped.
4) Liquid mass contributing both to the secondary damper mass and to the primary damper mass
5) Submerged obstacles such as gravel, perforated geometries, wires, tubes Description:
The embodiment comprises a rolling/rocking liquid tank/container (3)
The embodiment can damp vibrations in the horizontal plane.
Frequency $f_1$ and $f_2$ of could be determined experimentally.
The primary and secondary damper equivalent 1-dof masses could be determined experimentally.
Damping ($\zeta_2$) can be determined experimentally.
Damping ($\zeta_2$) could be generated with obstacles submerged into the liquid. The mass of the obstacles contributes to the primary damper mass.
As the primary damper mass moves horizontally, the curved track forces the secondary mass upwards contributing to a change in potential energy, i.e. the restoring force (stiffness) is gravity based.

FIG. 27 shows a 20$^{th}$ practical embodiment of the damper according to the invention.

Synergistic Effects:
The synergistic (Tuned Liquid damper) effects are similar to the 4$^{th}$ embodiment.

Elements:
1) Structure (moving) to be damped
2) Sphere or cylinder
3) Part of the primary damper mass (liquid tank) sphere, cylinder shaped.
4) Liquid mass contributing both to the secondary damper mass and to the primary damper mass
5) Submerged obstacles such as gravel, perforated geometries, wires, tubes Description:
The embodiment contains a rolling/rocking liquid tank/container (3)
The embodiment can damp vibrations in the horizontal plane.
The rocking frequency, $f_1$, can be estimated by common theory
The fundamental liquid sloshing frequency, $f_2$, can be determined experimentally.
The secondary damper equivalent 1-dof mass $m_2$ is determined experimentally.
Internal damping ($\zeta_2$) is generated with obstacles submerged into the liquid. The mass of the obstacles contributes to the primary damper mass.
The internal damping ($\zeta_2$) is determined experimentally.
As the primary damper mass moves horizontally, the curved track forces the secondary mass upwards contributing to a change in potential energy, i.e. the restoring force (stiffness) is gravity based.

FIG. 28 shows a 21$^{st}$ practical embodiment of the damper according to the invention Synergistic Effects:
This embodiment has synergistic effects similar to the 1$^{st}$ embodiment and the 4$^{th}$ embodiment (Tuned Liquid Damper).

Elements:
1) Structure (moving) to be damped
2) Primary spring
3) Primary damper mass
4) Additional spring
5) Liquid tank/container
6) Liquid mass contributing both to the secondary damper mass and to the primary damper mass
7) Submerged obstacles such as gravel, perforated geometries, wires, tubes Description:
The embodiment contains two sub-structures: an approximately undamped oscillator (2,3,4) and a liquid tank (5,6,7).
The embodiment can damp vibrations in the horizontal plane.
The frequencies $f_1$ and $f_2$ can be estimated by common theory or experimentally.
The internal damping ($\zeta_2$) can be determined experimentally.
The mass $m_1$ may be supported by guides.
The secondary damper equivalent 1-dof mass $m_2$ can be determined experimentally.
Springs (4) oriented perpendicular to (2) enables simple frequency adjustment, as the horizontal spring stiffness contribution is proportional with the spring preload.

FIG. 29 shows a 22$^{nd}$ practical embodiment of the damper according to the invention Synergistic Effects:
This embodiment has synergistic effects similar to the 1$^{st}$ embodiment and the 4$^{th}$ embodiment (Tuned Liquid Damper).

Elements:
1) Structure (moving) to be damped
2) Primary spring
3) Primary damper mass
4) Liquid tank/container
5) Liquid mass contributing both to the secondary damper mass and to the primary damper mass
6) Submerged obstacles such as gravel, perforated geometries, wires, tubes Description:
This embodiment contains two sub-structures: an approximately undamped oscillator (2,3) and a liquid tank (4,5,6).
The embodiment can damp vibrations in the horizontal plane.
The frequencies $f_1$ and $f_2$ can be estimated by common theory or experimentally.
The internal damping ($\zeta_2$) can be determined experimentally.
The mass $m_1$ may be supported by guides.
The secondary damper equivalent 1-dof mass $m^2$ can be determined experimentally.

FIG. 30 shows a 23$^{rd}$ practical embodiment of the damper according to the invention
Synergistic Effects:
This embodiment has synergistic effects similar to the 1$^{st}$ embodiment and the 6$^{th}$ embodiment.
Elements:
1) Structure (moving) to be damped
2) Primary spring
3) Primary damper mass
4) Hinge (rotating joint)
5) Hanger (wire, cable, rod, bar, beam)
6) Secondary damper mass
Description:
The embodiment contains two sub-structures: An approximately undamped oscillator (2,3) and a damped pendulum (4,5,6).
The embodiment can damp vibrations in the horizontal plane.
The frequencies $f_1$ and $f_2$ can be estimated by common theory or experimentally.
The internal damping ($\zeta_2$) can be determined experimentally.
The mass $m_1$ may be supported by guides.
Internal damping ($\zeta_2$) could be generated in the rotating joint (4).

FIG. 31 shows a 24$^{th}$ practical embodiment of the damper according to the invention.
Synergistic Effects:
This embodiment has synergistic effects similar to the 1$^{st}$ embodiment
The mass of the elastic bodies (5) would contribute to $m_1$, enabling full exploitation of element masses.
Elements:
1) Structure (moving) to be damped
2) Primary spring
3) Primary damper mass
4) Secondary damper mass
5) Elastic element (beam, bar, rod, leaf spring).
6) Shear damping element (friction, magnet, viscous, viscoelastic, rubber, elastomer).
Description:
The embodiment contains two sub-structures: An approximately undamped oscillator (2,3) and a damped pendulum (4,5,6).
The embodiment can damp vibrations in the horizontal plane or in the vertical plane (by rotating the embodiment).
The frequencies $f_1$ and $f_2$ can be estimated by common theory or experimentally.
The internal damping ($\zeta_2$) can be determined experimentally.
The mass $m_1$ may be supported by guides.
The secondary damper equivalent 1-dof mass $m_2$ can be determined experimentally.

FIG. 32 shows a 25$^{th}$ practical embodiment of the damper according to the invention.
Synergistic Effects:
This embodiment has synergistic effects similar to the 1$^{st}$ embodiment
Elements:
1) Structure (moving) to be damped
2) Primary spring
3) Primary damper mass
4) Additional spring
5) Secondary spring
6) Secondary damper mass
7) Secondary damper (dashpot)
Description:
The embodiment can damp vibrations in the horizontal plane or in the vertical plane (by rotating the embodiment).
The frequencies $f_1$ and $f_2$ can be estimated by common theory or experimentally.
The internal damping ($\zeta_2$) can be determined experimentally.
The masses $m_1$ and $m_2$ may be supported by guides.

FIG. 33 shows a 26$^{th}$ practical embodiment of the damper according to the invention.
Synergistic Effects:
This embodiment has synergistic effects similar to the 1$^{st}$ embodiment
The mass of the elastic bodies (5) would contribute to $m_1$, enabling full exploitation of element masses.
Elements:
1) Structure (moving) to be damped
2) Primary spring
3) Primary damper mass
4) Secondary damper mass
5) Elastic body/element able to shear, e.g. coil spring, elastomer pad/bearing, elastomer, laminated pad/bearing or sandwich element
Description:
The embodiment contains two sub-structures: An approximately undamped oscillator (2,3) and a mass supported by an elastic body (4,5).
The embodiment can damp vibrations in the horizontal plane or in the vertical plane (by rotating the embodiment).
The frequencies $f_1$ and $f_2$ can be estimated by common theory or experimentally.
The internal damping ($\zeta_2$) can be determined experimentally.
The mass $m_1$ may be supported by guides.
Internal damping ($\zeta_2$) could be generated by friction in shearing the elastic body (4).

FIG. 34 shows a 27$^{th}$ practical embodiment of the damper according to the invention.
Synergistic Effects:
This embodiment has synergistic effects similar to the 1$^{st}$ embodiment
The mass of the bearings/guide would contribute to $m_1$, enabling full exploitation of element masses.
Elements:
1) Structure (moving) to be damped
2) Primary spring
3) Primary damper mass
4) Secondary damper mass
5) Bearings with curved track or bearings following a curved track or guide.
6) Dashpot Description:
The embodiment contains two sub-structures: An approximately undamped oscillator (2,3) and a mass supported by bearings (4,5,6).
The embodiment can damp vibrations in the horizontal plane.
The frequencies $f_1$ and $f_2$ can be estimated by common theory or experimentally.
The internal damping ($\zeta_2$) can be determined experimentally.
The mass $m_1$ may be supported by guides.
As the secondary damper mass moves horizontally, the curved track forces the secondary mass upwards contributing to a change in potential energy, i.e. the restoring force (stiffness) is gravity based.
Internal damping ($\zeta_2$) is achieved with a dashpot or shear damping elements (friction, magnet, viscous, viscoelastic, rubber, elastomer).
FIG. 35 shows a 28$^{th}$ practical embodiment of the damper according to the invention.
Synergistic Effects:
This embodiment has synergistic effects similar to the 1$^{st}$ embodiment
The mass of the bearing and the rigid part between the primary mass and the secondary mass would contribute to $m_1$, enabling full exploitation of element masses.
Elements:
1) Structure (moving) to be damped
2) Hinge (Rotating joint, bearing)
3) Rigid rod, bar, beam
4) Hinge (Rotating joint, bearing)
5) Rigid rod, bar, beam
6) Secondary damper mass
7) Dashpot
8) Secondary spring
9) Primary damper mass
10) Primary spring
Description:
This embodiment contains two sub-structures: An approximately undamped oscillator (2,3,9,10) and a damped oscillator (4,5,6,7,8), both with rotational guides.
The embodiment can damp vibrations in the horizontal or vertical plane. (rotating the damper)
The frequencies $f_1$ and $f_2$ can be estimated by common theory or experimentally.
The internal damping ($\zeta_2$) can be determined experimentally.
Internal damping ($\zeta_2$) could be generated in the rotating joint (4).
The springs and dashpot could be movable to enable easy frequency and damping adjustment.
FIG. 36 shows a 29$^{th}$ practical embodiment of the damper according to the invention.
Synergistic Effects:
This embodiment has synergistic effects similar to the 1$^{th}$ embodiment
The mass of the elastic bodies (4) would contribute to the primary damper mass, enabling full exploitation of element masses.
Elements:
1) Structure (moving) to be damped
2) Elastic body/element able to shear, e.g. coil spring, elastomer pad/bearing, elastomer laminated pad/bearing, sandwich element
3) Primary damper mass
4) Elastic body/element able to shear, e.g. coil spring, elastomer pad/bearing, elastomer laminated pad/bearing, sandwich element
5) Secondary damper mass
Description:
The embodiment contains two sub-structures: A mass supported by an elastic body (2,3) and a mass supported by a damped elastic body (4,5)
The embodiment can damp vibrations in the horizontal or vertical plane (by rotating the damper).
The frequencies $f_1$ and $f_2$ can be estimated by common theory or experimentally.
The internal damping ($\zeta_2$) can be determined experimentally.
Internal damping ($\zeta_2$) could be generated by friction in shearing the elastic body (4).
FIG. 37 shows a 30$^{th}$ practical embodiment of the damper according to the invention.
Synergistic Effects:
This embodiment has synergistic effects similar to the 1$^{st}$ embodiment and the 4$^{th}$ embodiment (Tuned Liquid Damper).
Elements:
1) Structure (moving) to be damped
2) Elastic body/element able to shear, e.g. coil spring, elastomer pad/bearing, elastomer laminated pad/bearing, sandwich element
3) Part of the primary damper mass (liquid tank).
4) Liquid mass contributing both to the secondary damper mass and to the primary damper mass
5) Submerged obstacles such as gravel, perforated geometries, wires, tubes
Description:
The embodiment contains a liquid tank/container supported by an elastic body (2,3)
The embodiment can damp vibrations in the horizontal or vertical plane (by rotating the
damper)
The frequencies $f_1$ and $f_2$ can be estimated by common theory or experimentally.
The internal damping ($\zeta_2$) can be determined experimentally.
Internal damping ($\zeta_2$) can be generated with obstacles submerged into the liquid. The mass of the obstacles contributes to the primary damper mass.
The secondary damper equivalent 1-dof mass $m_2$ can determined experimentally.
FIG. 38 shows a 31$^{st}$ practical embodiment of the damper according to the invention.
Synergistic Effects:
This embodiment has synergistic effects similar to the 1$^{st}$ embodiment
The mass of the elastic bodies (4) would contribute to $m_1$, enabling full exploitation of element masses.
Elements:
1) Structure (moving) to be damped
2) Elastic body/element able to shear, e.g. coil spring, elastomer pad/bearing, elastomer laminated pad/bearing, sandwich element
3) Primary damper mass
4) Elastic element (beam, bar, rod, leaf spring).
5) Secondary damper mass
6) Shear damping element (friction, magnet, viscous, viscoelastic, rubber, elastomer) connected between primary and secondary damper mass Description:
The embodiment contains two sub-structures: A mass supported by an elastic body (2,3) and a damped oscillator (4,5,6)
The embodiment may damp vibrations in the horizontal or vertical plane (by rotating the damper)
The frequencies $f_1$ and $f_2$ can be estimated by common theory or experimentally.
The internal damping ($\zeta_2$) can be determined experimentally.
Internal damping ($\zeta_2$) could be generated by friction in shearing the elastic body (4).
The secondary damper equivalent 1-dof mass $m_2$ can be determined experimentally.

FIG. 39 shows a 32$^{nd}$ practical embodiment of the damper according to the invention.
Synergistic Effects:
This embodiment has synergistic effects similar to the 1$^{st}$ embodiment
Elements:
1) Structure (moving) to be damped
2) Elastic body/element able to shear, e.g. coil spring, elastomer pad/bearing, elastomer laminated pad/bearing, sandwich element
3) Primary damper mass
4) Hinge (rotating joint)
5) Hanger (wire, cable, rod, bar, beam)
6) Hinge (rotating joint)
7) Secondary damper mass
Description:
The embodiment contains two sub-structures: A mass supported by an elastic body (2,3) and a damped pendulum (4,5,6,7)
The embodiment can damp vibrations in the horizontal plane.
The frequencies $f_1$ and $f_2$ can be estimated by common theory or experimentally.
The internal damping ($\zeta_2$) can be determined experimentally.
Internal damping ($\zeta_2$) can be achieved with a dashpot or shear damping elements (friction, magnet, viscous, viscoelastic, rubber, elastomer).

FIG. 40 shows a 33$^{rd}$ practical embodiment of the damper according to the invention.
Synergistic Effects:
This embodiment has synergistic effects similar to the 1$^{st}$ embodiment
Elements:
1) Structure (moving) to be damped
2) Elastic body/element able to shear, e.g. coil spring, elastomer pad/bearing, elastomer laminated pad/bearing, sandwich element
3) Primary damper mass
4) Secondary spring
5) Secondary damper mass
6) Secondary dashpot
Description:
The embodiment contains two sub-structures: A mass supported by an elastic body (2,3) and a damped oscillator (4,5,6)
The embodiment can damp vibrations in the horizontal plane.
The frequencies $f_1$ and $f_2$ can be estimated by common theory or experimentally.
The internal damping ($\zeta_2$) can be determined experimentally.

FIG. 41 shows a 34$^{th}$ practical embodiment of the damper according to the invention.
Synergistic Effects:
This embodiment has synergistic effects similar to the 6$^{th}$ embodiment
The interaction between mass contributions to the primary and secondary damper masses enables advantageous tuning properties for the primary mass, see [2].
Elements:
1) Structure (moving) to be damped
2) Bearings with curved track or bearings following a curved track or guide.
3) Primary damper mass
4) Bearings with curved track or bearings following a curved track or guide.
5) Secondary damper mass
6) Dashpot
Description:
The embodiment contains two sub-structures: A mass supported by bearings (2,3) and a mass supported by bearings (4,5)
The embodiment can damp vibrations in the horizontal plane.
The frequencies $f_1$ and $f_2$ can be estimated by common theory or experimentally.
The internal damping ($\zeta_2$) can be determined experimentally.
As the damper mass moves horizontally, the curved track forces the damper masses upwards contributing to a change in potential energy, i.e. the restoring force (stiffness) is gravity based.
Internal damping ($\zeta_2$) is achieved with a dashpot or shear damping elements (friction, magnet, viscous, viscoelastic, rubber, elastomer).

FIG. 42 shows a 35$^{th}$ practical embodiment of the damper according to the invention.
Synergistic Effects:
This embodiment has synergistic effects similar to the 6$^{th}$ embodiment
Synergistic (Tuned Liquid damper) effects are similar to the 4$^{th}$ embodiment.
Elements:
1) Structure (moving) to be damped
2) Bearings with curved track or bearings following a curved track or guide.
3) Liquid tank/container
4) Liquid mass contributing both to the secondary damper mass and to the primary damper mass
5) Submerged obstacles such as gravel, perforated geometries, wires, tubes
Description:
The embodiment a liquid tank/container supported by bearings (2,3,4,5)
The embodiment can damp vibrations in the horizontal plane.
The frequencies $f_1$ and $f_2$ can be estimated by common theory or experimentally.
The internal damping ($\zeta_2$) can be determined experimentally.
As the primary damper mass moves horizontally, the curved track forces the damper masses upwards contributing to a change in potential energy, i.e. the restoring force (stiffness) is gravity based.
The secondary damper equivalent 1-dof mass $m_2$ is determined experimentally.

FIG. 43 shows a 36$^{th}$ practical embodiment of the damper according to the invention.

Synergistic Effects:

This embodiment has synergistic effects similar to the 6$^{th}$ embodiment

Damping could be generated by friction in shearing the elastic body (4).

Elements:
1) Structure (moving) to be damped
2) Bearings with curved track or bearings following a curved track or guide.
3) Primary damper mass
4) Elastic element (beam, bar, rod, leaf spring).
5) Secondary damper mass
6) Shear damping element (friction, magnet, viscous, viscoelastic, rubber, elastomer) connected between primary and secondary damper mass Description:

The embodiment contains two sub-structures: A mass supported by bearings (2,3) and a damped oscillator (4,5,6)

The embodiment can damp vibrations in the horizontal plane.

The frequencies $f_1$ and $f_2$ can be estimated by common theory or experimentally.

The internal damping ($\zeta_2$) can be determined experimentally.

Internal damping ($\zeta_2$) could be generated by friction in shearing the elastic body (4).

As the primary damper mass moves horizontally, the curved track forces the damper masses upwards contributing to a change in potential energy, i.e. the restoring force (stiffness) is gravity based.

The secondary damper equivalent 1-dof mass $m_2$ is determined experimentally.

FIG. 44 shows a 37$^{th}$ practical embodiment of the damper according to the invention.

Synergistic Effects:

This embodiment has synergistic effects similar to the 6$^{th}$ embodiment

Elements:
1) Structure (moving) to be damped
2) Bearings with curved track or bearings following a curved track or guide.
3) Primary damper mass
4) Hinge (rotating joint)
5) Hanger (wire, cable, rod, bar, beam)
6) Hinge (rotating joint)
7) Secondary damper mass Description:

The embodiment contains two sub-structures: A mass supported by bearings (2,3) and a damped pendulum (4,5,6,7).

The embodiment can damp vibrations in the horizontal plane.

The frequencies $f_1$ and $f_2$ can be estimated by common theory or experimentally.

The internal damping ($\zeta_2$) can be determined experimentally.

Internal damping ($\zeta_2$) is achieved with a dashpot or shear damping elements (friction, magnet, viscous, viscoelastic, rubber, elastomer).

As the primary damper mass moves horizontally, the curved track forces the damper masses upwards contributing to a change in potential energy, i.e. the restoring force (stiffness) is gravity based.

FIG. 45 shows a 38$^{th}$ practical embodiment of the damper according to the invention.

Synergistic Effects:

This embodiment has synergistic effects similar to the 6$^{th}$ embodiment

Elements:
1) Structure (moving) to be damped
2) Bearings with curved track or bearings following a curved track or guide.
3) Primary damper mass
4) Secondary spring
5) Secondary mass
6) Secondary dashpot Description:

The embodiment contains two sub-structures: A mass supported by bearings (2,3) and a damped oscillator (4,5,6).

The embodiment can damp vibrations in the horizontal plane.

The frequencies $f_1$ and $f_2$ can be estimated by common theory or experimentally.

The internal damping ($\zeta_2$) can be determined experimentally.

As the primary damper mass moves horizontally, the curved track forces the damper masses upwards contributing to a change in potential energy, i.e. the restoring force (stiffness) is gravity based.

FIG. 46 shows a schematic cross-sectional view of a dashpot 100 used as a part of the second damping element in an embodiment of the damper according to the invention. The dashpot 100 is intended for use in an upright position in order to damp vibrations in an essentially vertical direction such as typical vibrations occurring in floors, walkways, bridges or buildings. The dashpot 100 shown in FIG. 46 and discussed below can be used in any of the above embodiments having a dashpot.

The dashpot 100 comprises a cylinder 110 which is at least partly filled with a viscous liquid 120, e.g. a silicone oil, said cylinder 110 being attached to said first damping body 3. The dashpot 100 furthermore comprises a piston 130 having a piston body 140 which is submerged in said viscous liquid 120 and a piston rod 150 connected to said piston body 140, said piston rod 150 being attached to the second damping body 5. An outer diameter of said piston body 140 is smaller than an inner diameter of said cylinder 110. The dashpot 100 is furthermore provided with a piston ring 160 having an outer diameter larger than said outer diameter of said piston body 140 and smaller than said inner diameter of said cylinder 110, said piston ring 160 being mounted to said piston body 140 such as to be movable in a plane perpendicular to said piston rod 150. The piston body 140 comprises a piston body main part 140a and a piston body cover part 140b which, in the embodiment shown in FIG. 46, are attached to each other such as to slidably hold said piston ring 160 between them. To this end, as can be seen in the figure, the piston body main part 140a has a recess which slidably receives the piston ring 160. The piston body main part 140a and the piston body cover part 140b can be rotated with respect to each other as will be described further below and can then be locked by means of one or more screws not shown in the figure. Alternatively the piston body main part 140a and the piston body cover part 140b could also be integral.

The design of the dashpot 100 of this embodiment achieves the following effects: Relative movements between the first damping body 3 and the second damping body 5 are damped by the piston body 140 moving up and down and displacing the viscous liquid 120 as is known e.g. from dashpots used in vehicles. However, contrary to vehicles or other applications, the first damping body and the second damping body are only mounted on site at the structure. Consequently, small misalignments between the cylinder 110 and the piston body 140 cannot be avoided. If the outer diameter of the piston body 140 and the inner diameter of the cylinder 110 were essentially identical, then such small misalignments would lead to considerable friction between the piston body 140 and the cylinder 110. As a consequence, certain small amplitude vibrations would be too small to cause a displacement of the piston body 140 relative to the cylinder 110 and would therefore not be damped.

In order to avoid this lack of damping for small amplitude vibrations the outer diameter of the piston body 140 is smaller than the inner diameter of the cylinder 110, so that they can largely be prevented from getting in contact with each other. However, due to the difference in diameter between the piston body 140 and the cylinder 110 a flow path is provided in between whose characteristics, e.g. width, would depend on the specific misalignment rendering the required precise adjustment of the second damping element difficult. In order to allow for a precise adjustment of the second damping element, the piston ring 160 is provided such as to be movable in a plane perpendicular to said piston rod 150, i.e. the horizontal plane in FIG. 46. Irrespective of the specific misalignment between the cylinder 110 and the piston body 140 the loosely fitting piston ring 160 defines a predetermined flow path width available for the viscous liquid flowing between the cylinder 110 and the piston body 140. In other words, the horizontally slidable piston ring 160 absorbs horizontal misalignments between the cylinder 110 and the piston body 140.

In addition to the flow path whose width is determined by the outer diameter of the piston ring 160 and the inner diameter of the cylinder 110, additional flow paths may be provided by bores or slots through the piston body 140. Two such bores are indicated by dashed lines in FIG. 46. Damping can be adjusted by fully or partially blocking bores by means of screws. Alternatively, in the embodiment shown in FIG. 46, the piston body main part 140a and the piston body cover part 140b may both be provided with slots having a predetermined width in the angular direction, i.e. in the horizontal plane. Rotating the piston body main part 140a and the piston body cover part 140b relative to each other allows to vary the overlap of the respective slots and thus the flow path available through the piston body 140 between a flow path of essentially zero width and a flowpath having a predetermined maximum width in order to adjust the damping characteristics of the second damping element.

In practical implementations for damping vertical vibrations in a building a dashpot 100 with the following dimensions has successfully been used:
  Cylinder inner radius: 68 mm
  Piston ring outer radius: 67 mm
  Piston ring inner radius: 57 mm
  Piston ring thickness: 6 mm
  Total piston thickness: 14 mm
  Total cylinder height ca. 200 mm
  Total dashpot height ca. 300 mm In the embodiment of FIG. 46 the cylinder 110 is attached to the first damping body 3 whereas the piston rod 150 is attached to the second damping body 5. However, it is also possible to choose an inverse arrangement in which the cylinder 110 is attached to the second damping body 5 whereas the piston rod 150 is attached to the first damping body 3.

In FIG. 46 an embodiment is shown in which the dashpot 100 is part of the second damping element arranged between the first damping body and the second damping body. As an alternative or in addition to such an arrangement, it is also possible to provide such a dashpot 100 as part of the first damping element arranged between the first damping body and the structure. In this case the cylinder 110 can be attached to the structure whereas the piston rod 150 is attached to the first damping body, or, alternatively, the cylinder 110 can be attached to the first damping body whereas the piston rod 150 is attached to the structure.

The dashpot 100 shown in FIG. 46 and described above can be used in any of the preceding embodiments in which the first and/or the second damping element comprises a dashpot.

REFERENCES

[1] Maurer & Söhne, Schwingungstilger und Viskodämpfer, February 2001, available at https://web.archive.org/web/20160304134217/http://www.maurer.eu/fileadmin/medien/05_downloads/Prospekte/DE/BSS/Prosp_MAURER_Schwingungstilger Viskosedaempfer_de.pdf
[2] L. Tophøj, N. Grathwol & S. O. Hansen (2018), Effective Mass of Tuned Mass Dampers, MDPI Vibration 1, 1, pp. 192-206.
[3] Lei Zuo, Effective and Robust Vibration Control Using Series Multiple Tuned-Mass Dampers, J. Vibration and Acoustics 131, ASME, (2009).
[4] Korenev & Reznikov (1993), Dynamic Vibration Absorbers, Wiley & Sons.
[5] Toshihiko Asami (2017), Optimal Design of Double-Mass Dynamic Vibration Absorbers Arranged in Series or in Parallel, J. Vibration and Acoustics 139, ASME
[6] G. B. Warburton (1982), Optimum Absorber Parameters for Various Combinations of Response and Excitation Parameters, Earthq. eng. struct. dyn. 10, pp. 381-401.
[7] Jerome J. Connor (2002), Introduction to Structural Motion Control, 1st. ed., Prentice Hall.

The invention claimed is:

1. A damper for damping vibrations of a structure, comprising:
  a first damping unit, comprising a first damping body having a first mass ($m_1$), a first spring element having a first spring constant ($k_1$) and a first damping element having a first damping constant ($c_1$), wherein said first damping body is configured to be attached to said structure via said first spring element and said first damping element; and
  a second damping unit, comprising a second damping body having a second mass ($m_2$), a second spring element having a second spring constant ($k_2$) and a second damping element having a second damping constant ($c_2$);
  wherein said second damping body is configured to be attached to said first damping body via said second spring element and said second damping element;
  wherein
  $m_0$ is the mass of said structure;

$$\mu = (m_1 + m_2)/m_0;$$

$$\omega_0 = \frac{\sqrt{k_1}}{m_1};$$

$$\omega_2 = \frac{\sqrt{k_2}}{m_2};$$

$$\Omega_2 = \omega_2/\omega_0;$$

wherein $0.018 \leq \mu \leq 0.25$; and wherein $\Omega_2$ is selected such that an estimate $d^*_e$ of an ensemble radius of the damper defined by $$d^*_e(\mu, \Omega_2) = 1 - \left(\frac{9}{2} \frac{\mu(1+\mu)^{5/2} \Omega_2^4}{(1-\Omega_2^2)^{3/2} \sqrt{3 + 6\Omega_2 - \sqrt{1 + \Omega_2^2 - 2\Omega_2^4}}}\right)^{1/4}$$

fulfills the relation $d^*_e > 0.375$.

2. A damper according to claim 1, wherein $\Omega_2$ is selected such that $d^*_e > 0.40$.

3. A damper according to claim 2, wherein $\Omega_2$ is selected such that $d^*_e > 0.45$.

4. A damper according to claim 1, wherein said first spring element and/or said second spring element comprise a coil spring.

5. A damper according to claim 4, wherein said first damping body and/or said second damping body is configured for a linear movement having a horizontal component and/or a vertical component, the damper comprising at least one guide element for guiding said linear movement.

6. A damper according to claim 1, further comprising a flexible element on which said first damping body and said second damping body are arranged.

7. A damper according to claim 6, wherein said flexible element comprises a beam, a bar, a rod and/or a leaf spring.

8. A damper according to claim 6, wherein said first damping body and/or said second damping body is movably arranged on said flexible element.

9. A damper according to claim 6, furthermore comprising a shear damping element attached to said flexible element and/or to said first damping body and/or to said second damping body.

10. A damper according to claim 9, wherein said shear damping element is configured to dissipate vibration energy through friction and/or magnetic forces.

11. A damper according to claim 1, further comprising a pendulum configured to be suspended from said structure.

12. A damper according to claim 11, furthermore comprising a liquid tank attached to said pendulum.

13. A damper according to claim 12, furthermore comprising obstacles submerged within said liquid tank.

14. A damper according to claim 1, wherein said second damping element comprises a dashpot, comprising:
- a cylinder which is at least partly filled with a viscous liquid, said cylinder being attached to one of said first damping body and said second damping body;
- a piston having a piston body which is submerged in said viscous liquid and a piston rod connected to said piston body, said piston rod being attached to the other of said first damping body and said second damping body, wherein an outer diameter of said piston body is smaller than an inner diameter of said cylinder; and
- a piston ring having an outer diameter larger than said outer diameter of said piston body and smaller than said inner diameter of said cylinder, wherein said piston ring is mounted to said piston body such as to be movable in a plane perpendicular to said piston rod.

15. A damper according to claim 14, wherein said piston body comprises a piston body main part and a piston body cover part attached to or integral with said piston body main part such as to slidably hold said piston ring.

16. A damper according to claim 1, wherein said first damping body and/or said second damping body comprises two or more plates attached to each other, e.g. being bolted together.

17. A structure, comprising a damper according to claim 1.

18. A structure according to claim 17, wherein the structure is a wind turbine tower, a building, a building floor, a bridge, a footbridge, or stairs.

19. A computer-implemented method for configuring a damper according to claim 1 for broadband damping action, comprising:
- defining an ensemble of different structures whose vibrations are to be damped;
- computing, for each structure out of a set of structures distributed throughout said ensemble, a maximum frequency response Ho as a function of vibration frequency;
- minimizing a highest value of said maximum frequency response $H_\infty$.

* * * * *